United States Patent
Watanabe et al.

(10) Patent No.: US 9,591,532 B2
(45) Date of Patent: Mar. 7, 2017

(54) COMMUNICATION CONTROL METHOD, RADIO COMMUNICATION SYSTEM, RADIO BASE STATION, AND NON-TRANSITORY COMPUTER READABLE MEDIUM

(71) Applicant: NEC Corporation, Tokyo (JP)

(72) Inventors: Tomohiro Watanabe, Tokyo (JP); Yoshio Ueda, Tokyo (JP); Atsushi Nakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/442,627

(22) PCT Filed: Jul. 24, 2013

(86) PCT No.: PCT/JP2013/004494
§ 371 (c)(1),
(2) Date: May 13, 2015

(87) PCT Pub. No.: WO2014/076855
PCT Pub. Date: May 22, 2014

(65) Prior Publication Data
US 2016/0198370 A1    Jul. 7, 2016

(30) Foreign Application Priority Data
Nov. 13, 2012  (JP) ................. 2012-249670

(51) Int. Cl.
*H04W 36/00* (2009.01)
*H04W 92/20* (2009.01)
*H04W 24/02* (2009.01)

(52) U.S. Cl.
CPC ... *H04W 36/0061* (2013.01); *H04W 36/0083* (2013.01); *H04W 24/02* (2013.01); *H04W 92/20* (2013.01)

(58) Field of Classification Search
CPC ............................................... H04W 36/0061
See application file for complete search history.

(56) References Cited

U.S. PATENT DOCUMENTS 8,917,702 B2 * 12/2014 Wegmann ......... H04W 36/0083
370/331
8,954,075 B2   2/2015 Paterson
(Continued)

FOREIGN PATENT DOCUMENTS

| EP | 2166796 A1 | 3/2010 |
| JP | 2010-171660 | 8/2010 |

(Continued)

OTHER PUBLICATIONS

Extended European Search Report (EESR) dated Mar. 22, 2016; Appln. No. 13854309.5.
(Continued)

*Primary Examiner* — Nathan Mitchell
(74) *Attorney, Agent, or Firm* — Young & Thompson

(57) ABSTRACT

A communication control method includes: transmitting, by a second radio base station (103) adjacent to a first radio base station (100), an attribute value relating to a second cell (102) under control of the second radio base station (103) to the first radio base station; receiving, by the first radio base station, the attribute value relating to the second cell; comparing, by the first radio base station, the attribute value relating to the second cell with an attribute value relating to a first cell under control of the first radio base station; and executing, by the first radio base station, processing for matching the attribute value relating to the second cell with the attribute value relating to the first cell in accordance with a predetermined criterion when the received attribute value relating to the second cell is different from the attribute value relating to the first cell.

20 Claims, 17 Drawing Sheets

(56) References Cited

U.S. PATENT DOCUMENTS

| | | | |
|---|---|---|---|
| 9,031,551 B2 | 5/2015 | Karla et al. | |
| 2010/0027507 A1* | 2/2010 | Li | H04W 36/0055 370/331 |
| 2012/0184322 A1* | 7/2012 | Falconetti | H04W 28/18 455/524 |
| 2013/0230014 A1* | 9/2013 | Kitaji | H04W 28/08 370/329 |
| 2015/0031360 A1* | 1/2015 | Choi | H04W 36/22 455/436 |
| 2015/0133119 A1* | 5/2015 | Huang | H04W 36/0094 455/436 |
| 2015/0289169 A1* | 10/2015 | Capdevielle | H04W 24/02 455/436 |

FOREIGN PATENT DOCUMENTS

| | | |
|---|---|---|
| JP | 2012-5120 | 1/2012 |
| JP | 2012-070074 | 4/2012 |
| JP | 2013-502083 | 1/2013 |
| JP | 2013-535167 | 9/2013 |
| WO | WO 2010/050885 | 5/2010 |
| WO | 2011/019083 | 2/2011 |
| WO | 2012/000760 | 1/2012 |
| WO | WO 2012/090357 | 7/2012 |

OTHER PUBLICATIONS

R3-110159, 3GPP TSG-RAN WG3 #70bis, Dublin, Ireland, Jan. 17-21, 2011, Agenda Item: 11.2.2; Source: Qualcomm Incorporated; Title: ANR Attribute Correction.

XP007907980, "Self-Organizing Networks (SON) in 3 GPP Long Term Evolution", Sujuan Feng, Nomor Research GmbH, Munich, Germany dated May 20, 2008; pp. 1-15.

International Search Report, PCT/JP2013/004494, Sep. 17, 2013.

3GPP TS 32.101 ver. 11.0.0, Dec. 2011, 3rd Generation Partnership Project; Technical Specification Group Services and System Aspects; Telecommunication management; Principles and high level requirements (Release 11).

3GPP TS 32.423 ver. 11.0.0, Dec. 2011, 3rd Generation Partnership Project; Technical Specification Group Services and System Aspects; Telecommunication management; Subscriber and equipment trace; Trace data definition and management (Release 11).

3GPP TS 32.762 ver. 11.0.0, Dec. 2011, 3rd Generation Partnership Project; Technical Specification Group Services and System Aspects; Telecommunication management; Evolved Universal Terrestrial Radio Access Network (E-UTRAN) Network Resource Model (NRM) Integration Reference Point (IRP); Information Service (IS) (Release 11).

3GPP TS 36.300 ver. 11.0.0, Dec. 2011, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).

3GPP TS 36.331 ver. 10.4.0, Dec. 2011, 3rd Generation Partnership Project; Technical Specification Group Radio Access Network; Evolved Universal Terrestrial Radio Access (E-UTERA); Radio Resource Control (RRC); Protocol specification (Release 10).

3GPP TS 36.423 ver. 10.4.0, Dec. 2011, 3rd Generation Partnership Project; Technical Specification Group Radio Access Network; Evolved Universal Terrestrial Radio Access Network (E-UTRAN); X2 application protocol (X2AP) (Release 10).

3GPP TS 48.018 ver. 10.4.0, Dec. 2011, 3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 10).

Ericsson, Huawei, ZTE, Add IRAT ANR from UTRAN to E-UTRAN, 3GPP TSG SA WG5 Meeting#79 S5-113023, Oct. 14, 2011.

Japanese Office Action dated Aug. 9, 2016 in corresponding Japanese Patent Application No. 2015-236187 with partial English translation of Japanese Office Action.

* cited by examiner

| IE/Group Name | Range/Value |
|---|---|
| Message Type | |
| Global eNB ID | |
| Served cells | 1..<maxCellineNB> |
| >Served Cell Information | |
| >Neighbour Information | 0..<maxnoofNeighbours> |
| >>ECGI | |
| ⋮ | ⋮ |
| >>EARFCN | |
| >>isHOAllowed | Yes/No |
| >>BlackcellList | Yes/No |
| >>isLBAllowedList | Yes/No |

ADDED: isHOAllowed, BlackcellList, isLBAllowedList

Fig. 5

| IE/Group Name | Range/Value |
|---|---|
| Message Type | |
| Served cells To Add | 0..<maxCellineNB> |
| >Served Cell Information | |
| >Neighbour Information | 0..<maxnoofNeighbours> |
| >>ECGI | |
| ⋮ | ⋮ |
| >>isHOAllowed | Yes/No |
| >>BlackcellList | Yes/No |
| >>isLBAllowedList | Yes/No |
| ⋮ | ⋮ |

(The last three rows marked ADDED)

Fig. 6

| AFTER ATTRIBUTE UNIFYING PROCESSING, ACTUAL HANDOVER SETTING OF RADIO BASE STATION 103 FROM CELL 102 TO CELL 101 IS DETERMINED | TEMPORARY HANDOVER SETTING OF RADIO BASE STATION 100 FROM CELL 101 TO CELL 102 IS DETERMINED | TEMPORARY HANDOVER SETTING OF RADIO BASE STATION 103 FROM CELL 102 TO CELL 101 IS DETERMINED |
|---|---|---|
| NO | NO | NO |
| NO | NO | YES |
| NO | YES | NO |
| YES | YES | YES |

Fig. 9

| AFTER ATTRIBUTE UNIFYING PROCESSING, ACTUAL BLACKLIST SETTING OF RADIO BASE STATION 103 FROM CELL 102 TO CELL 101 IS DETERMINED | TEMPORARY BLACKLIST SETTING OF RADIO BASE STATION 100 FROM CELL 101 TO CELL 102 IS DETERMINED | TEMPORARY BLACKLIST SETTING OF RADIO BASE STATION 103 FROM CELL 102 TO CELL 101 IS DETERMINED |
|---|---|---|
| NO | NO | NO |
| YES | NO | YES |
| YES | YES | NO |
| YES | YES | YES |

Fig. 10

| AFTER ATTRIBUTE UNIFYING PROCESSING, ACTUAL LB SETTING OF RADIO BASE STATION 103 FROM CELL 102 TO CELL 101 IS DETERMINED | TEMPORARY LB SETTING OF RADIO BASE STATION 100 FROM CELL 101 TO CELL 102 IS DETERMINED | TEMPORARY LB SETTING OF RADIO BASE STATION 103 FROM CELL 102 TO CELL 101 IS DETERMINED |
|---|---|---|
| NO | NO | NO |
| YES | NO | YES |
| YES | YES | NO |
| YES | YES | YES |

Fig. 11

| IE/Group Name | Presence | Range | IE Type and Reference | Semantics Description |
|---|---|---|---|---|
| >>Radio Network Layer Cause | M | | ENUMERATED ( Handover Desirable for Radio Reasons, Time Critical Handover, Resource Optimisation Handover, Reduce Load in Serving Cell, Partial Handover, Unknown New eNB UE X2AP ID, Unknown Old eNB UE X2AP ID, Unknown pair of UE X2AP ID, HO Target not Allowed, TX2RELOCoverall Expiry, TRELOCprep Expiry, Cell not Available, No Radio Resources Available in Target Cell, Invalid MME Group ID, Unknown MME Code, Encryption And/Or Integrity Protection Algorithms Not Supported, ReportCharacteristicsEmpty, NoReportPeriodicity, ExistingMeasurement ID, Unknown eNB Measurement ID, Measurement Temporarily not Available, Unspecified, ..., Load Balancing, Handover Optimisation, Value out of allowed range, Multiple E-RAB ID instances, Switch Off Ongoing, Not spported QCI value, Measurement not Supported for the object, isLBAllowed ) | |

Fig. 16

COMMUNICATION CONTROL METHOD, RADIO COMMUNICATION SYSTEM, RADIO BASE STATION, AND NON-TRANSITORY COMPUTER READABLE MEDIUM

TECHNICAL FIELD

The present invention relates to a method for controlling a base station between neighboring radio base stations.

BACKGROUND ART

With the explosive growth in demand for broadband multimedia communication services such as the Internet and video delivery, there has been progress made in the introduction of a radio communication system that employs a modulation method for transmitting a large volume of data. There is an increasing demand for LTE (Long Term Evolution) and the like as standards for high-speed communications that enable transmission of a large volume of data at once. In these communication modes, a handover technique for minimizing the discontinuity of communications even when a mobile terminal moves between neighboring cells covered by a radio base station is important.

Examples of handover failure include handover failure by a user that moves between cells, failure of load balancing (communication load distribution), and a handover to an unexpected cell.

Patent Literature 1 discloses a technique relating to a handover of a base station of a femtocell.

Patent Literature 2 discloses a general method for a base station to notify a communication terminal of blacklist information.

However, neither Patent Literature 1 nor Patent Literature 2 presents any solution for the cause of handover failure.

CITATION LIST

Patent Literature

[Patent Literature 1] Japanese Unexamined Patent Application Publication No. 2012-070074
[Patent Literature 2] Japanese Unexamined Patent Application Publication No. 2010-171660

Non Patent Literature

[Non Patent Literature 1] 3GPP TS 32.101 ver.11.0.0
[Non Patent Literature 2] 3GPP TS 32.423 ver.11.0.0
[Non Patent Literature 3] 3GPP TS 32.762 ver.11.0.0
[Non Patent Literature 4] 3GPP TS 36.300 ver.11.0.0
[Non Patent Literature 5] 3GPP TS 36.331 ver.10.4.0
[Non Patent Literature 6] 3GPP TS 36.423 ver.10.4.0
[Non Patent Literature 7] 3GPP TS 48.018 ver.10.4.0

SUMMARY OF INVENTION

Technical Problem

As described above, there is a problem that handover failure may occur due to failure in controlling neighboring radio base stations during a handover between cells of the neighboring radio base stations.

The present invention has been made to solve the above-mentioned problem, and an object of the present invention is to provide a communication control method, a radio communication system, a radio base station, and a non-transitory computer readable medium which prevent the problem of handover failure from occurring.

Solution to Problem

A first exemplary aspect is a communication control method including: transmitting, by a second radio base station adjacent to a first radio base station, an attribute value relating to a second cell to the first radio base station, the second cell being under control of the second radio base station; receiving, by the first radio base station, the attribute value relating to the second cell; comparing, by the first radio base station, the attribute value relating to the second cell with an attribute value relating to a first cell, the first cell being under control of the first radio base station; and executing, by the first radio base station, processing for matching the attribute value relating to the second cell with the attribute value relating to the first cell in accordance with a predetermined criterion, when the received attribute value relating to the second cell is different from the attribute value relating to the first cell.

A second exemplary aspect is a radio communication system including: a first radio base station; and a second radio base station adjacent to the first radio base station. The second radio base station includes means for transmitting, to the first radio base station, an attribute value relating to a second cell under control of the second radio base station. The first radio base station includes: means for receiving, by the first radio base station, the attribute value relating to the second cell; and means for matching the attribute value relating to the second cell with an attribute value relating to a first cell in accordance with a predetermined criterion, when the attribute value relating to the second cell is different from the attribute value relating to the first cell, the first cell being under control of the first radio base station.

A third exemplary aspect is a radio base station including: means for acquiring an attribute value relating to a first cell under control of a neighboring radio base station; and means for matching the attribute value relating to the first cell with an attribute value relating to a second cell in accordance with a predetermined criterion, when the acquired attribute value relating to the first cell is different from the attribute value relating to the second cell, the second cell being under control of the radio base station.

A fourth exemplary aspect is a non-transitory computer readable medium causing a computer to execute processing including: acquiring an attribute value relating to a first cell under control of a first radio base station, and acquiring an attribute value relating to a second cell under control of a second radio base station; and matching the attribute value relating to the first cell with the attribute value relating to the second cell in accordance with a predetermined criterion, when the acquired attribute value relating to the first cell is different from the acquired attribute value relating to the second cell.

Advantageous Effects of Invention

According to the present invention, it is possible to prevent occurrence of handover failure by controlling neighboring radio base stations during a handover of a mobile terminal between cells of neighboring radio base stations.

BRIEF DESCRIPTION OF DRAWINGS

FIG. 5 shows an example in which settings for an LTE handover attribute value, a blacklist attribute value, and an LB attribute value are added;

FIG. 6 shows an example in which settings for the LTE handover attribute value, the blacklist attribute value, and the LB attribute value are added;

FIG. 9 is a table showing an algorithm for matching settings for handovers between radio base stations;

FIG. 10 is a table showing an algorithm for determining an actual blacklist setting of the radio base station 100 from the cell 101 to the cell 102;

FIG. 11 is a table showing an algorithm for unifying actual LB settings between radio base stations;

FIG. 16 is a diagram showing a case where "is LB Allowed" is included in Cause values of the content of a MOBILITY CHANGE FAILURE message.

DESCRIPTION OF EMBODIMENTS

Figure 1:
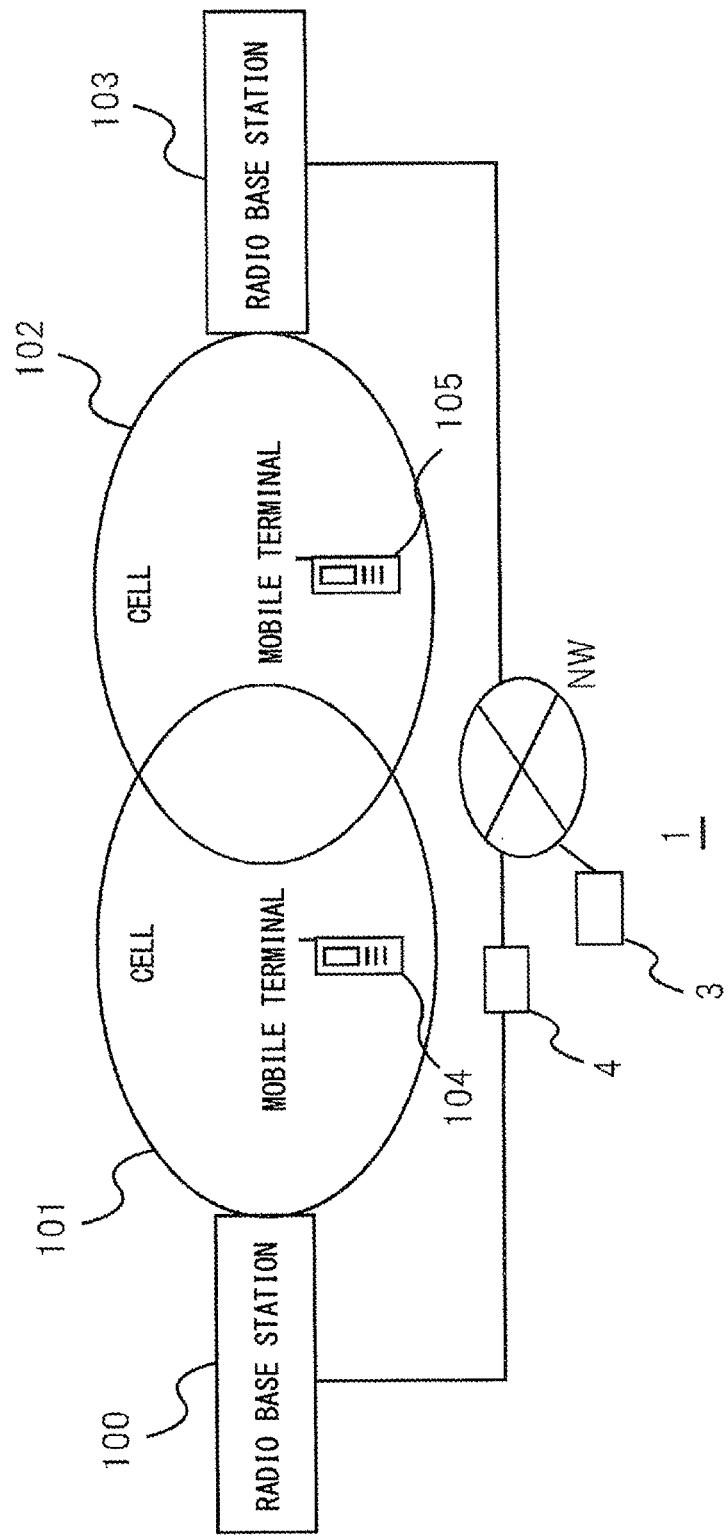
FIG. 1 is a diagram showing a configuration of nodes according to an exemplary embodiment of the present invention.

An LTE handover is controlled using attribute values which are determined for each base station with respect to neighboring cells set in each radio base station. The term "attribute value" refers to a parameter defined in the 3GPP (Third Generation Partnership Project) standard for standardizing the LTE. However, in the control method using the current attribute values, handover failure occurs in some cases.

The above-mentioned handover failure occurs because, for example, the attribute values of neighboring cells, which are set for each of the radio base stations, are individually set to the radio base stations by an operator. Another cause is that radio base stations which use different algorithms individually set attribute values without knowing the setting of attribute values for the other radio base stations, which leads to a mismatch between the attribute values. Means for transmitting neighboring cell information between radio base stations or between radio base control stations can be achieved by using an X2 link (Non Patent Literature 6).

However, the means for transmitting the neighboring cell information does not include the attribute values corresponding to the pieces of neighboring cell information, and does not include any means for detecting a mismatch between the attribute values. Accordingly, there is a possibility that the attribute values will be different between the radio base stations. As a result, handover failure, load balancing failure, or a handover to an unexpected cell is caused by a user that moves between cells.

Further another cause of the handover failure is that 2G/3G/LTE have a function of exchanging the neighboring cell information between radio base stations, but cannot exchange O & M (operation and maintenance) attribute values such as "is HO Allowed" and "is LB Allowed". For this reason, handover failure or load balancing failure between two cells occurs in 2G/3G/LTE, and there has been no solution to the problem.

According to this exemplary embodiment, a method for adding attribute values for each neighboring cell in information associated with the neighboring cells respectively included in radio base stations and for matching the attribute values between neighboring base stations will be illustrated below.

Causes of Handover Failure

When the attribute value (in the case of LTE, "is HO Allowed" disclosed in Non Patent Literature 3 or "No HO" disclosed in Non Patent Literature 4, as defined in the 3GPP standard) for a cell of a neighboring radio base station, which is set by a radio base station, is different from the attribute value included in the neighboring radio base station, handover failure of a mobile terminal between the radio base station occurs.

Three examples of the handover failure are given below.

FAILURE EXAMPLE 1

A handover failure example in which setting for information about permission/prohibition of a handover (hereinafter referred to as "handover permission/prohibition information") is different between the cells of the radio base stations will be described below.

A configuration in which a cell A and a cell B are controlled by different radio base stations will now be considered.

First, a case where a handover of a mobile terminal from the cell A to the cell B is allowed, while a handover of the mobile terminal from the cell B to the cell A is prohibited will be described.

At this time, the case where the mobile terminal moves from the cell A to the cell B and then returns from the cell B to the cell A includes the following steps.

Step S1: The handover from the cell A to the cell B is successful.

Step S2: After step S1, the mobile terminal attempts to perform the handover from the cell B to the cell A.

Step S3: However, since the handover from the cell B to the cell A is prohibited, the mobile terminal moves to another cell, or a communication disconnection occurs.

Such a mismatch in the handover permission/prohibition information is caused due to a setting error by the operator. An upper node that controls the radio base stations may control the handover attribute value to be changed by using an algorithm such as MLB (Mobility Load Balancing) or MRO (Mobility Robustness Optimization). In this case, the set attribute value is different between the radio base stations, which may result in a mismatch between the handover attribute values in the radio base stations.

FAILURE EXAMPLE 2

A base station can notify a blacklist so as to prevent measurement of a specific cell. Such attribute information is hereinafter referred to as measurement permission/prohibition information. The above-mentioned handover failure of the mobile terminal may occur due to a difference in setting of the blacklist (corresponding to "black Cells To Add Mo List" in "Meas Object EUTRA" disclosed in Non Patent Literature 5) for the cells between the radio base stations, i.e., a different in setting for the measurement permission/prohibition information.

A configuration in which the cell A and the cell B are controlled by different radio base stations will now be considered. Since the cell A does not set the cell B in a blacklist, the mobile terminal in the cell A can carry out the measurement of the cell B and can acquire the information about the cell B.

On the other hand, since the cell B sets the cell A in the blacklist, the mobile terminal in the cell B is prohibited from measuring the cell A and thus cannot acquire the information about the cell A.

At this time, the case where the mobile terminal moves from the cell A to the cell B and then returns from the cell B to the cell A includes the following steps.

Step S1: The handover from the cell A to the cell B is successful.

Step S2: After step S1, the mobile terminal attempts to perform a handover to the cell A because the radio wave quality of the cell A is excellent; however, the handover is not successful and the mobile terminal performs a handover to another cell, or handover failure occurs.

FAILURE EXAMPLE 3

As a result of a difference in the attribute values between the radio base stations, not only the handover failure, but also load balancing (communication load distribution) failure occurs. The LTE sets the attribute value called "is LB Allowed" (Non Patent Literature 3) (hereinafter referred to as "load distribution control permission/prohibition information) in load balancing.

A configuration in which the cell A and the cell B are controlled by different radio base stations will now be considered.

"is LB Allowed" from the cell A to the cell B indicates "Yes", that is, load balancing is allowed.

In a case where "is LB Allowed" from the cell B to the cell A indicates "No", that is, load balancing is prohibited, when the traffic of the cell A is heavy, the following steps are taken.

Step S1: The mobile terminal in the cell A is caused to perform a handover to the cell B so as to distribute the traffic from the cell A to the cell B.

Step S2: Since "is LB Allowed" from the cell A to the cell B indicates "Yes", the mobile terminal in the cell A can perform a handover to the cell B, and thus the mobile terminal in the cell A can easily perform a handover to the cell B.

Step S3: On the other hand, it is necessary to prevent the mobile terminal from easily performing a handover from the cell B to the cell A. This is because the mobile terminal which has performed the handover in step S2 is prevented from easily returning from the cell B to the cell A.

Step S4: The same boundary is originally set for the handover between the cell A and the cell B during network construction.

Figure 17:
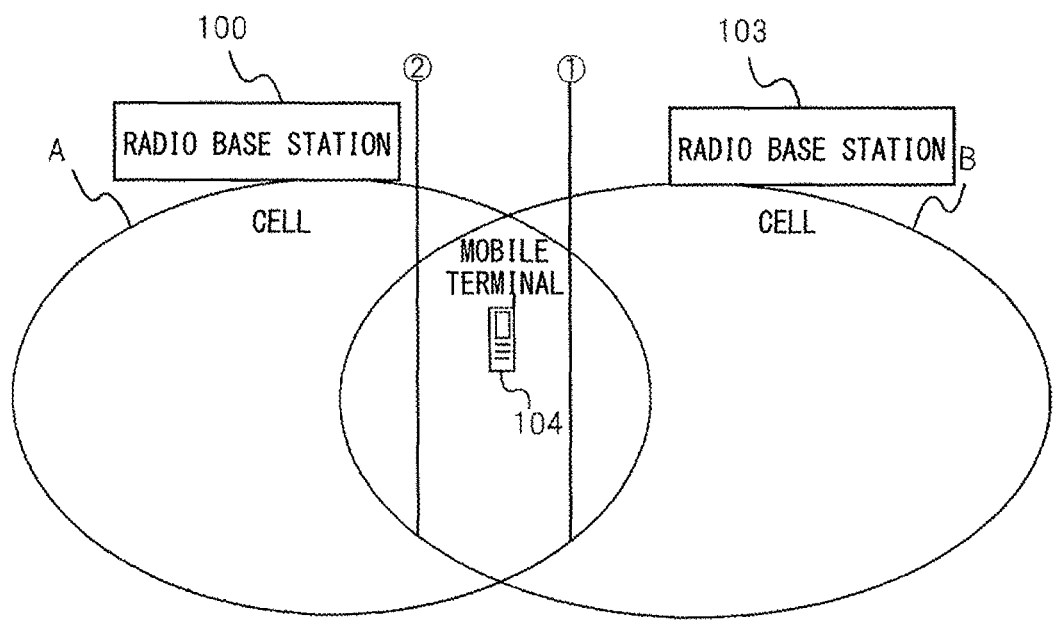
FIG. 17 is a diagram showing a handover boundary when there is a mismatch between "is LB Allowed" of a radio base station and "is LB Allowed" of another radio base station.

For example, as shown in FIG. 17, both the cell A and the cell B set a boundary (1) as a handover boundary. If the cell A changes the setting of the handover boundary to a boundary (2) for load balancing, the cell B also changes the setting of the handover boundary to the boundary (2) in the same manner as the cell A. This applies only to the case where the policies of "is LB Allowed" are unified. The above-mention example assumes a case where the cell B is set to prohibit load balancing from the cell A. Accordingly, the cell A as shown in FIG. 17 sets the boundary (2) as the boundary of the handover to the cell B, and the cell B sets the boundary (1) as the boundary of the handover to the cell A.

With this configuration, when a mobile terminal 104 attempts to perform a handover from the cell A to the cell B, the cell B attempts to cause the mobile terminal to perform a handover to the cell A because the handover boundary is set at the boundary (1). After that, the mobile terminal 104, which has returned to the cell A, is caused to perform a handover to the cell A or the cell B. As a result, the mobile terminal 104 performs a ping-pong handover between the cell A and the cell B.

Further, the mobile terminal 104 performs a handover to the cell B for load balancing from the cell A to the cell B. However, since "is LB Allowed" from the cell B to the cell A indicates "No", a number of mobile terminals 104 which have performed the handover from the cell A are located in the cell B, which results in congestion in the cell B. For this reason, load balancing is not satisfactorily performed in the entire system.

Matching between attribute values for load balancing has another problem. In the current 3GPP (Non Patent Literature 6) standard, notification of a parameter change related to load balancing is performed by transmitting and receiving MOBILITY CHANGE REQUEST/ACKNOWLEDGE messages between radio base stations. Even when a certain radio base station transmits the MOBILITY CHANGE REQUEST message to a neighboring radio base station, the radio base station which has received the message may return a MOBILITY CHANGE FAILURE message. In the current situation, when the radio base station which has received the message sets "No" as "is LB Allowed" and returns the MOBILITY CHANGE FAILURE message, the radio base station which has transmitted the massage cannot recognize the reason why the neighboring base station has returned the MOBILITY CHANGE FAILURE message and cannot recognize if the cause is a mismatch between the attributes.

As a result, the attributes cannot be matched between the radio base stations, which brings the mobile terminal 104 into a ping-pong handover state.

In addition, interference between cells can be prevented by unifying the attribute values for "is ICIC Information Send Allowed" between the radio base stations by using ICIC (Inter-Cell Interference Coordination) for preventing interference between cells.

The above-mentioned examples of handover failure, i.e., failure in unifying the attributes between different radio base stations, occur due to the following causes.
1) A mismatch in output by a planning tool
2) A mismatch due to different vendors
3) A mismatch due to different carriers 4) A mismatch due to RAN SHARING
5) A mismatch due to an ambiguous definition of an interface between a radio base station and EM (Element Management)

First Exemplary Embodiment

Exemplary embodiments of the present invention will be described below with reference to the drawings.

A first exemplary embodiment relates to a method in which an attribute value to be actually set for each cell is determined from an attribute value of a radio base station and an attribute value of a neighboring radio base station, based on exchange of information about attributes of cells between the radio base stations Explanation of System Configuration FIG. 1 shows a configuration of a radio communication system 1 according to an exemplary embodiment of the present invention. The radio communication system 1 includes radio base stations (100, 103), cells (101, 102), and radio terminals (104, 105). A radio base station control device 3 and a relay device 4 are connected via a communication network.

The radio base station 100 and the radio base station 103 are radio base stations each having an interface for exchanging cell information. The LTE carries out exchange of neighboring cell information as messages, such as X2 SETUP REQUEST, X2 SETUP RESPONSE, and ENB CONFIGURATION UPDATE, between radio base stations by using an X2 interface. The cell 101 which is controlled by the radio base station 100 and the cell 102 which is controlled by the base station 103 are neighboring cells. The radio base station control device 3 and the relay device 4 will be described in detail later.

In this case, the cell 101 and the cell 102 may be large cells (for example, macrocells) which are planarly expanded as a public radio system, or may be cells (for example, microcells, picocells, and femtocells) which are mainly located in a geographically limited area, such as, the inside of a house, a company, and the like.

Figure 2:
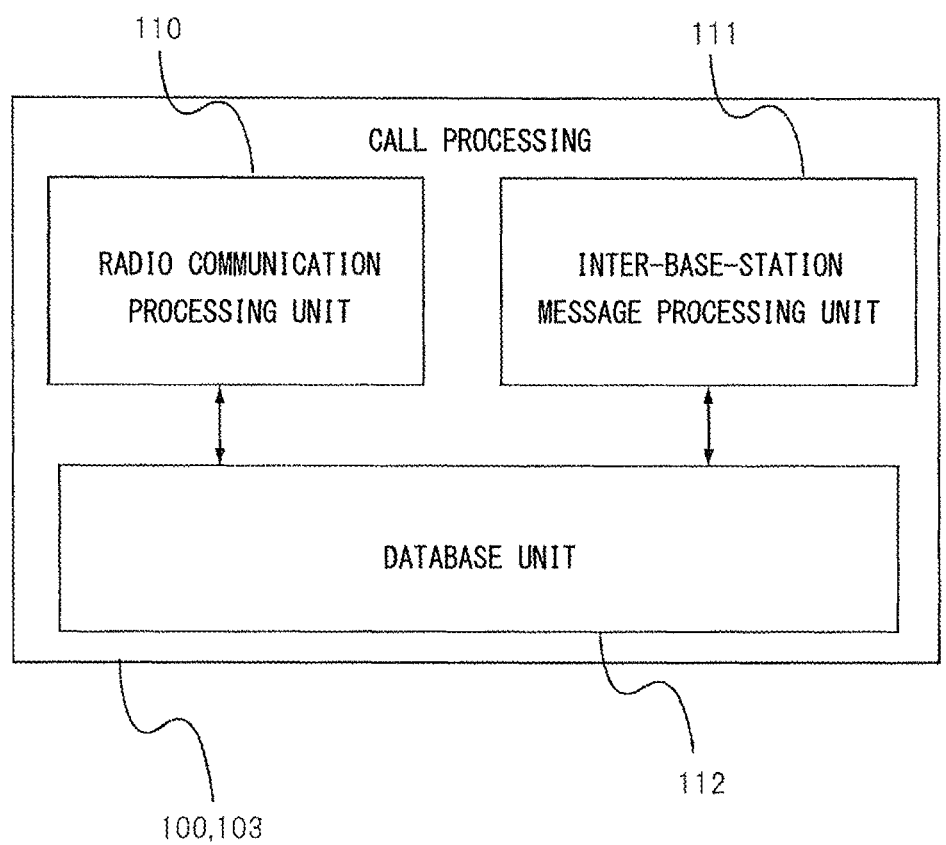
FIG. 2 is a block diagram showing a radio base station.

FIG. 2 shows an overview of a system within each radio base station. Each radio base station (100, 103) includes a radio communication processing unit 110, an inter-base-station message processing unit 111, and a database unit 112. The radio communication processing unit 110 transmits the neighboring cell information and the like to a mobile terminal. The inter-base-station message processing unit 111 transmits neighboring cell information to a neighboring base station and receives neighboring cell information from the neighboring base station.

The inter-base-station message processing unit 111 transmits neighboring cell information (information 1), which is stored in the database unit 112, to the neighboring base station. Further, the inter-base-station message processing unit 111 stores neighboring cell information (information 2), which is received from the neighboring base station, in the database unit 112. Then the radio communication processing unit 110 transmits, to the mobile terminal, neighboring cell information (information 3) which is derived from the information 1 and the information 2.

Figure 3:
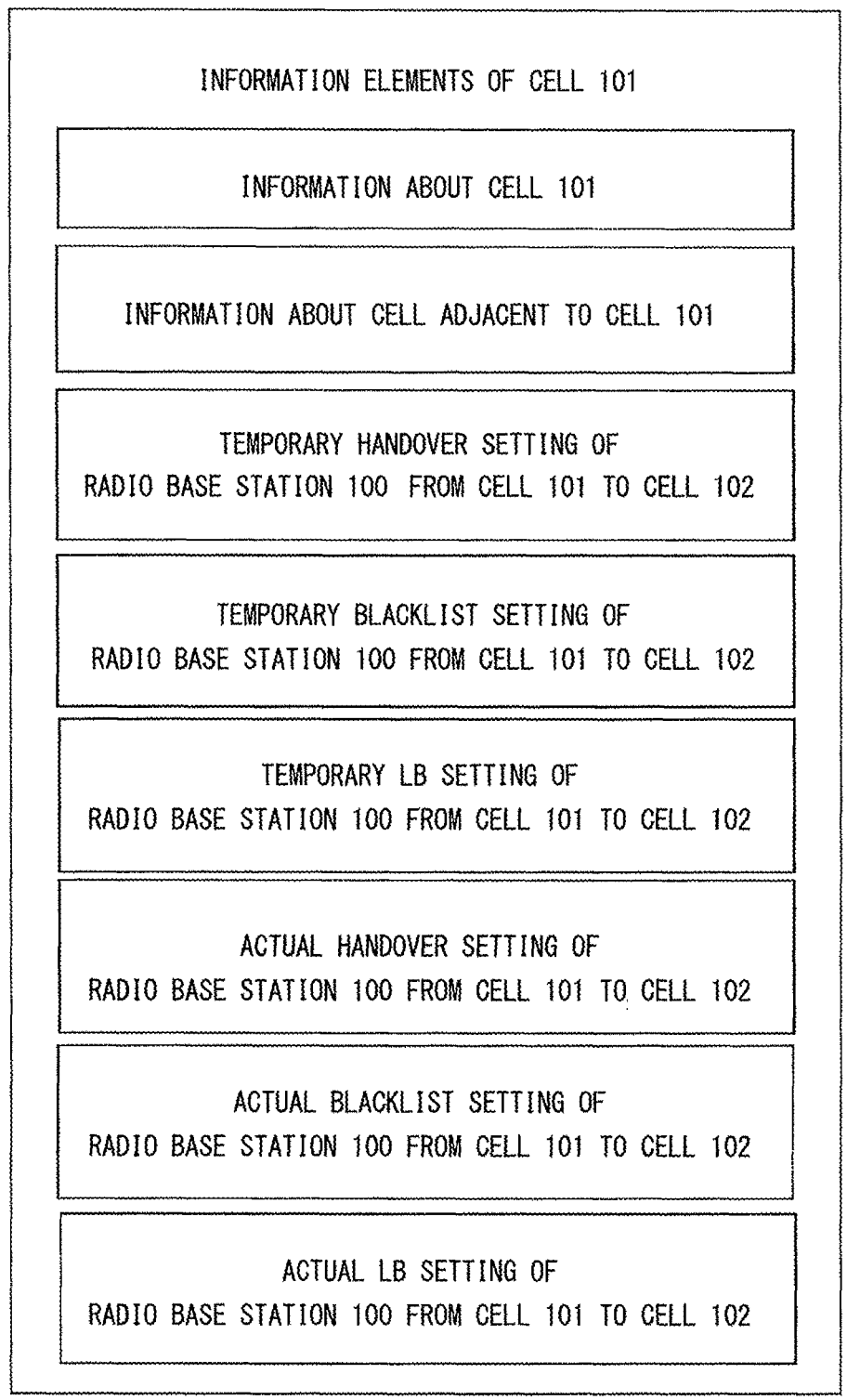
FIG. 3 shows information elements of a cell 101 which are transmitted from a radio base station 100 to a radio base station 103.
Figure 4:
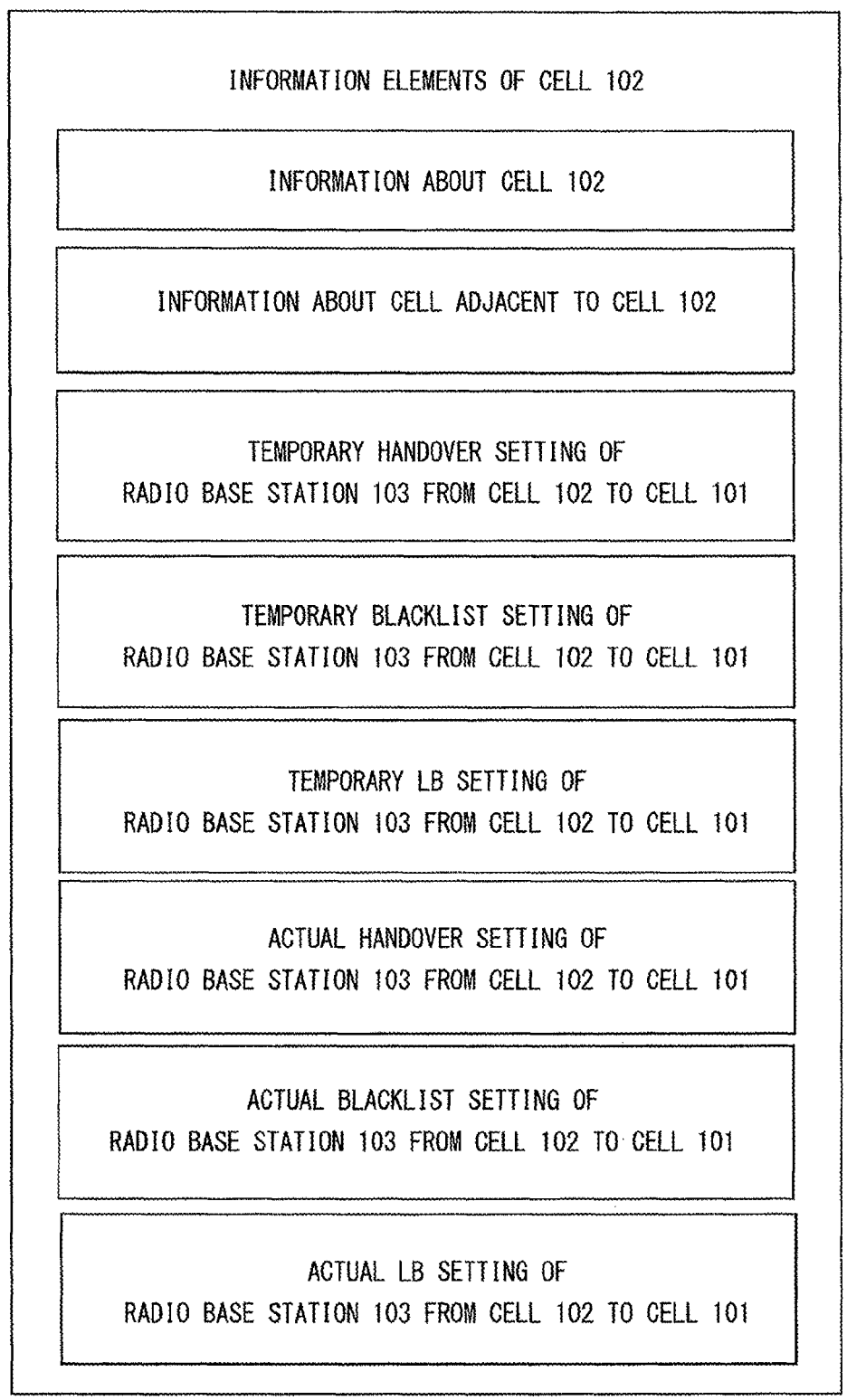
FIG. 4 shows information elements of a cell 102 which are transmitted from the radio base station 103 to the radio base station 100.

The database unit 112 stores neighboring cell information elements. FIG. 3 shows the information elements of the cell 101 which are transmitted to the radio base station 103 from the radio base station 100. Similarly, FIG. 4 shows the information elements of the cell 102 which are transmitted to the radio base station 100 from the radio base station 103.

The information elements of the cell 101 which are transmitted to the radio base station 103 from the radio base station 100 are listed below.

(Information About Cell 101)

Information about cells adjacent to the cell 101 (also including the information about the cell 102 in this case)

A temporary handover setting of the radio base station 100 from the cell 101 to the cell 102

A temporary blacklist setting of the radio base station 100 from the cell 101 to the cell 102

A temporary LB (Load Balancing) setting of the radio base station 100 from the cell 101 to the cell 102

An actual handover setting of the radio base station 100 from the cell 101 to the cell 102

An actual blacklist setting of the radio base station 100 from the cell 101 to the cell 102

An actual LB (Load Balancing) setting of the radio base station 100 from the cell 101 to the cell 102

Note that the temporary handover setting, the temporary blacklist setting, and the temporary LB setting need not necessarily be transmitted to the mobile terminal. The above-mentioned cell information elements are set for each neighboring cell.

The difference between the temporary handover setting of the radio base station 100 from the cell 101 to the cell 102 and the actual handover setting of the radio base station 100 from the cell 101 to the cell 102 will now be described. The value for the temporary handover setting is not necessarily the same as the value for the actual handover setting. The actual handover setting of the radio base station 100 from the cell 101 to the cell 102 is determined based on the temporary handover setting of the radio base station 100 from the cell 101 to the cell 102 and the temporary handover setting received from the radio base station 103.

The actual handover setting refers to a handover setting actually applied by the radio base station 100. On the other hand, the temporary handover setting can be made by an operator or an algorithm such as MRO (Mobility Robustness Optimization). The actual handover setting refers to an attribute value, the setting of which cannot be changed by the operator, MRO, or the like.

Similarly, the radio base station 100 applies the temporary blacklist setting from the cell 101 to the cell 102, the actual blacklist setting from the cell 101 to the cell 102, the temporary LB setting from the cell 101 to the cell 102, and the actual LB setting from the cell 101 to the cell 102.

If a policy regarding the handover setting indicates "Yes", the handover is allowed. If the policy indicates "No", the handover is prohibited. In the following description, "Yes" and "No" for the handover setting are used in the meanings set out above. The handover setting corresponds to "is HO Allowed" in the 3GPP standard.

If a policy regarding the blacklist setting indicates "Yes", a cell is included in a blacklist. If the policy indicates "No", the cell is not included in the blacklist. In the following description, "Yes" and "No" for the blacklist setting are used in the meanings set out above.

When a policy regarding the LB setting indicates "Yes", the LB is executed. When the policy indicates "No", the LB is not executed. In the following description, "Yes" and "No" for the LB setting are used in the meanings set out above.

The information elements of the cell 102 which are transmitted from the radio base station 103 to the radio base station 100 are as follow.

Information about the cell 102

Information about cells adjacent to the cell 102 (also including the information about the cell 101 in this case)

Temporary handover setting of the radio base station 103 from the cell 102 to the cell 101

Temporary blacklist setting of the radio base station 103 from the cell 102 to the cell 101

Temporary LB setting of the radio base station 103 from the cell 102 to the cell 101

Actual handover setting of the radio base station 103 from the cell 102 to the cell 101

Actual blacklist setting of the radio base station 103 from the cell 102 to the cell 101

Actual LB setting of the radio base station 103 from the cell 102 to the cell 101

Note that the temporary handover setting, the temporary blacklist setting, and the temporary LB setting need not necessarily be transmitted to the mobile terminal.

FIGS. 5 and 6 each show an example in which an LTE handover attribute value, a blacklist attribute value, and an LB attribute value setting are added.

The neighboring cell information includes X2 SETUP REQUEST, X2 SETUP RESPONSE message, and ENB CONFIGURATION UPDATE. In this exemplary embodiment, settings for is HO Allowed, Black cell List, and is LB Allowed are added to these messages as attribute values. The below-described operation according to an exemplary embodiment corresponds to an exchange of X2 SETUP REQUEST and X2 SETUP RESPONSE between the radio base station 100 and the radio base station 103.

Explanation of Operation

Figure 7:
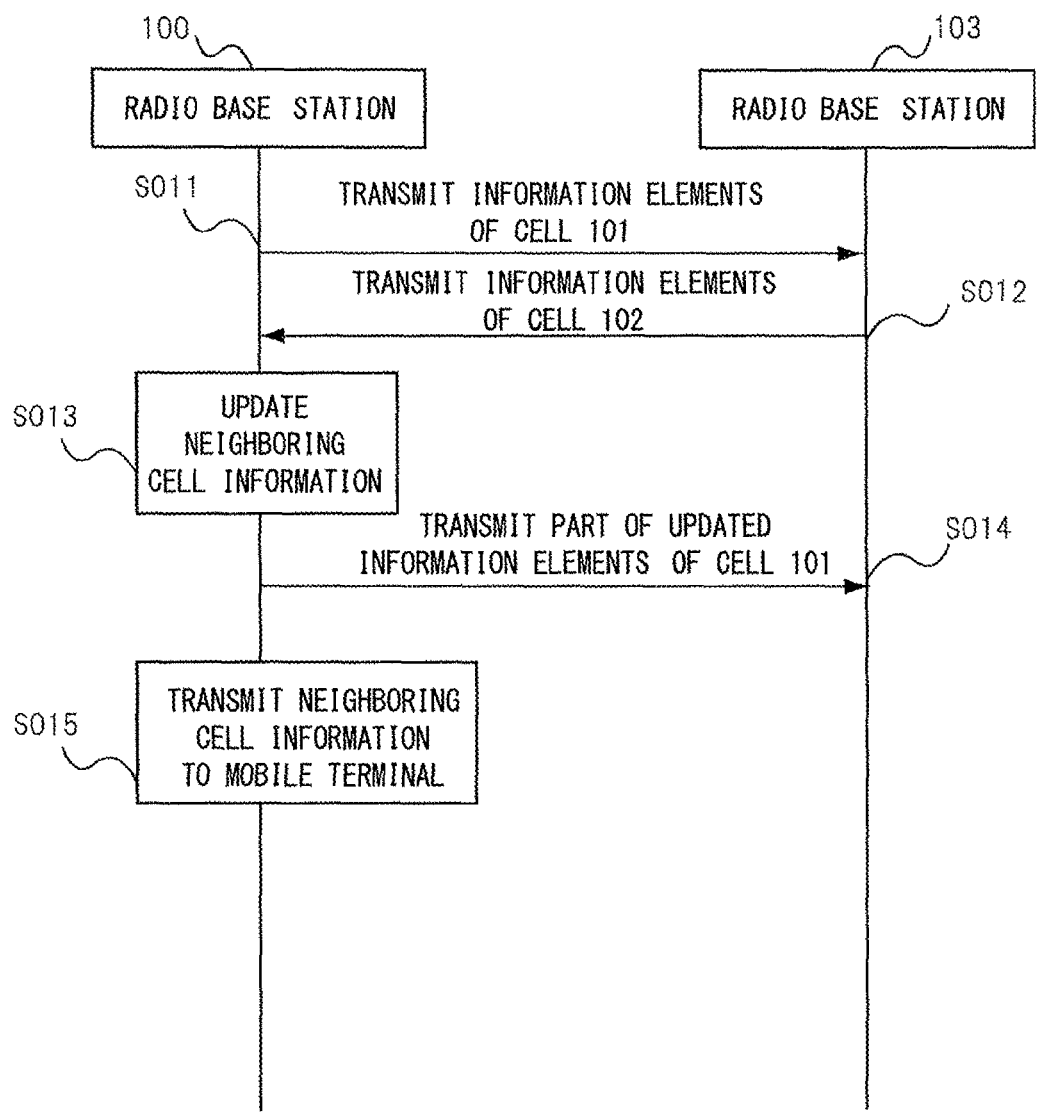
FIG. 7 is a diagram showing a state in which the radio base station 100 transmits information elements of the cell 101 to the radio base station 103.

As shown in FIG. 7, the inter-base-station message processing unit 111 in the radio base station 100 reads out the information about the cell 101, which is stored in the database unit 112, and transmits the information elements of the cell 101 to the radio base station 103. In this case, the information elements of the cell 101 include a handover setting, a blacklist setting, and an LB setting, and are transmitted from the radio base station 100 to the radio base station 103 (S011).

The inter-base-station message processing unit 11 in the radio base station 103 stores the received information elements of the cell 101 in the database unit 112. The inter-base-station message processing unit 111 in the radio base station 103 reads out the information about the cell 102, which is stored in the database unit 112, and transmits the information elements of the cell 102 to the radio base station 100. The inter-base-station message processing unit 111 in the radio base station 103 transmits, to the radio base station 100, the information elements of the cell 102 which include a handover setting, a blacklist setting, a the LB setting (S012).

In this exemplary embodiment, the attribute values of the neighboring cell information are transmitted and received between the radio base stations. The inter-base-station message processing unit 111 in the radio base station 100 reads the information about the cell 102 and stores the read information in the database unit 112. Then the radio base station 100 updates the neighboring cell information (S013).

After that, the inter-base-station message processing unit 111 in the radio base station 100 compares the attribute value for the temporary handover setting of the radio base station 103 from the cell 102 to the cell 101, which has been received earlier and included in the information elements of the cell 102 stored in the database unit 112, with the attribute value for the temporary handover setting of the radio base station 100 from the cell 101 to the cell 102. Then the inter-base-station message processing unit 111 determines the actual handover setting of the radio base station 100 from the cell 101 to the cell 102 based on an algorithm shown in FIG. 9. After that, the inter-base-station message processing unit 111 in the radio base station 100 stores the actual handover setting in the database unit 112.

The inter-base-station message processing unit 111 in the radio base station 100 compares the attribute value for the temporary blacklist setting of the radio base station 103 from the cell 102 to the cell 101, which has been received earlier and included in the information elements of the cell 102 stored in the database unit 112, with the attribute value for the temporary blacklist setting of the radio base station 100 from the cell 101 to the cell 102. Then the inter-base-station message processing unit 111 determines the actual blacklist setting of the radio base station 100 from the cell 101 to the cell 102 based on an algorithm shown in FIG. 10. After that, the inter-base-station message processing unit 111 in the radio base station 100 stores the actual blacklist setting in the database unit 112.

The inter-base-station message processing unit 111 in the radio base station 100 compares the attribute value for the temporary LB setting of the radio base station 103 from the cell 102 to the cell 101, which has been received earlier and included in the information elements of the cell 102 stored in the database unit 112, with the attribute value for the temporary LB setting of the radio base station 100 from the cell 101 to the cell 102. Then the inter-base-station message processing unit 111 determines the actual LB setting of the radio base station 100 from the cell 101 to the cell 102 based on the algorithm shown in FIG. 10. After that, the inter-base-station message processing unit 111 in the radio base station 100 stores the actual LB setting in the database unit 112.

The inter-base-station message processing unit 111 in the radio base station 100 reads out the updated information elements of the cell 101 from the database unit 112, and transmits part of the information to the radio base station 103 (S014).

Part of the updated information elements of the cell 101 is listed below.

An actual handover setting of the radio base station 100 from the cell 101 to the cell 102, the actual handover setting being updated by comparing the temporary handover settings between the radio base stations.

An actual blacklist setting of the radio base station 100 from the cell 101 to the cell 102, the actual blacklist setting being updated by comparing the temporary blacklist settings between the radio base stations.

An actual LB setting of the radio base station 100 from the cell 101 to the cell 102, the actual LB setting being updated by comparing the temporary the LB settings between the radio base stations.

After that, the radio communication processing unit 110 in the radio base station 100 transmits the information elements of the neighboring cell 102, which are read from the database unit 112, to the mobile terminal 104 under control of the cell 101 (S015).

FIG. 7 shows a case where the cell information is first sent to the radio base station 103 from the radio base station 100. However, the cell information may be first sent to the radio base station 100 from the radio base station 103.

Figure 8:
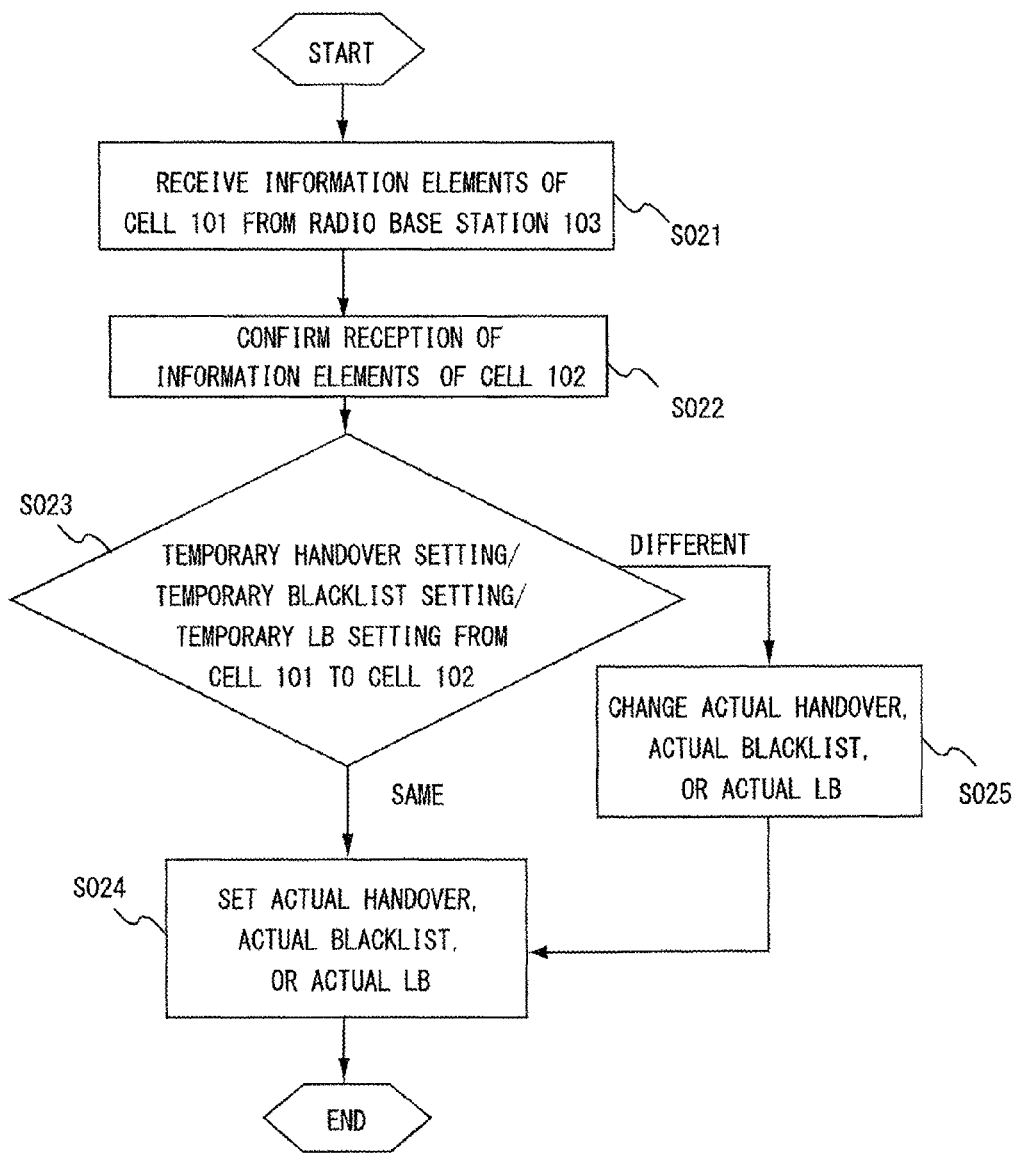
FIG. 8 is a diagram showing an algorithm for matching attribute values.

FIG. 8 shows an algorithm for matching, in the base stations, the attribute values which are transmitted and received between the base stations.

The inter-base-station message processing unit 111 in the radio base station 100 receives the information elements of the cell 102 from the radio base station 103, and stores the received information elements in the database unit 112 (S021). The inter-base-station message processing unit 111 in the radio base station 100 confirms the temporary handover setting, the temporary blacklist setting, and the temporary LB setting which are included in the information elements of the cell 102 stored in the database unit 112 (S022).

In the following processing, a method for actual handover setting will be described. Processing for actual blacklist setting and actual LB setting is carried out in the same manner as in the processing for the actual handover setting.

The inter-base-station message processing unit 111 in the radio base station 100 confirms the temporary handover setting of the radio base station 103 from the cell 102 to the cell 101 which is included in the information elements of the cell 102 of the radio base station 103 stored in the database unit 112 (S023).

(1) When the temporary handover setting of the radio base station 100 from the cell 101 to the cell 102, which is included in the information elements of the cell 101 of the base station 100 stored in the database unit 112, is the same as the temporary handover setting of the radio base station 103 from the cell 102 to the cell 101, which is included in the information elements of the cell 102 received from the base station 103, the inter-base-station message processing unit 111 in the radio base station 100 sets the same attribute value for the actual handover setting of the radio base station 100 from the cell 101 to the cell 102 as the attribute value for the temporary handover setting (S024).

(2) When the temporary handover setting of the radio base station 100 from the cell 101 to the cell 102, which is included in the information elements of the cell 101 of the base station 100 stored in the database unit 112, is different from the temporary handover setting of the radio base station 103 from the cell 102 to the cell 101, which is included in the information elements of the cell 102 received from the base station 103, the inter-base-station message processing unit 111 in the radio base station 100 changes the actual handover setting (S025). An algorithm for changing the attribute value will be described later with reference to FIG. 9.

FIG. 9 shows an example of the algorithm for the radio base stations to match the handover settings between the radio base stations.

Given below is an example of the algorithm for matching the actual handover setting of the radio base station 103 from the cell 101 to the cell 102, which is one of the information elements of the cell 101 of the radio base station 100, with the actual handover setting of the radio base station 103 from the cell 102 to the cell 101, which is included in the information elements of the cell 102 received from the base station 103.

(1) A case where the temporary handover setting of the radio base station 100 from the cell 101 to the cell 102, which is included in the information elements of the cell 101 of the base station 100 stored in the database unit 112, is the same as the temporary handover setting of the radio base station 103 from the cell 102 to the cell 101

When both of the settings indicate "Yes", the inter-base-station message processing unit 111 in the radio base station 100 transmits, to the database unit 112, the actual handover setting "Yes" of the radio base station 100 from the cell 101 to the cell 102. The database unit 112 updates the actual handover setting "Yes". This allows the radio base station 100 to be actually adaptable to the handover from the cell 101 to the cell 102.

When both of the settings indicate "No", the inter-base-station message processing unit 111 in the radio base station 100 transmits, to the database unit 112, the actual handover setting "No" of the radio base station 100 from the cell 101 to the cell 102. The database unit 112 updates the actual handover setting "No". This allows the radio base station 100 to be actually adaptable to the handover from the cell 101 to the cell 102.

(2) A case where either the temporary handover setting of the radio base station 100 from the cell 101 to the cell 102, which is included in the information elements of the cell 101 of the base station 100 stored in the database unit 112, or the temporary handover setting of the radio base station 103 from the cell 102 to the cell 101, which is included in the information elements of the cell 102 received from the base station 103

The inter-base-station message processing unit 111 transmits, to the database unit 112, the actual handover setting "No" of the radio base station 100 from the cell 101 to the cell 102. The database unit 112 updates the actual handover setting "No".

This allows the radio base station 100 to be actually adaptable to the handover from the cell 101 to the cell 102. If the attribute value set for the cell 101 is different from the attribute value set for the cell 102, the settings for the attribute values can be matched to "Yes" or "No", as long as the same operation is carried out in all cells according to a predetermined criterion for each algorithm.

FIG. 10 shows an example of the algorithm for the radio base stations to match the blacklist settings between the radio base stations.

Given below is an example of the algorithm for matching the actual blacklist setting of the radio base station 103 from the cell 101 to the cell 102, which is one of the information elements of the cell 101 of the base station 100, with the actual blacklist setting of the radio base station 103 from the cell 102 to the cell 101, which is included in the information elements of the cell 102 received from the base station 103.

(1) A case where the temporary blacklist setting of the radio base station 100 from the cell 101 to the cell 102, which is included in the information elements of the cell 101 of the base station 100 stored in the database unit 112, is the same as the temporary blacklist setting of the radio base station 103 from the cell 102 to the cell 101

When both of the settings indicate "Yes", the inter-base-station message processing unit 111 in the radio base station 100 transmits, to the database unit 112, the actual blacklist setting "Yes" of the radio base station 100 from the cell 101 to the cell 102. The database unit 112 updates the actual blacklist setting "Yes". This allows the radio base station 100 to be actually adaptable to the blacklist from the cell 101 to the cell 102.

When both of the settings indicate "No", the inter-base-station message processing unit 111 in the radio base station 100 transmits, to the database unit 112, the actual blacklist setting "No" of the radio base station 100 from the cell 101 to the cell 102. The database unit 112 updates the actual blacklist setting "No". This allows the radio base station 100 to be actually adaptable to the blacklist from the cell 101 to the cell 102.

(2) A case where either the temporary blacklist setting of the radio base station 100 from the cell 101 to the cell 102, which is included in the information elements of the cell 101 of the base station 100 stored in the database unit 112, or the temporary blacklist setting of the radio base station 103 from the cell 102 to the cell 101, which is included in the information elements of the cell 102 received from the base station 103, indicates "Yes"

The inter-base-station message processing unit 111 in the radio base station 100 transmits, to the database unit 112, the actual blacklist setting "Yes" of the radio base station 100 from the cell 101 to the cell 102. The database unit 112 updates the actual blacklist setting "Yes". This allows the radio base station 100 to be actually adaptable to the blacklist from the cell 101 to the cell 102.

FIG. 11 shows an example of the algorithm for the radio base stations to match the actual LB settings between the radio base stations.

The actual LB settings between the radio base stations are matched using an exemplary algorithm shown in FIG. 11 by employing a method similar to the algorithm for matching the blacklist settings between the radio base stations. Also in this case, if the attribute value set for the cell 101 is different from the attribute value set for the cell 102, the settings for the attribute values can be matched to "Yes" or "No", as long as the same operation is carried out in all cells according to a predetermined criterion for each algorithm.

The above exemplary embodiment illustrates an example in which the attribute value of the base station 100 is changed. However, the present invention is not limited to this exemplary embodiment. The present invention may include a step in which the base station 100 transmits the information elements of the cell 101 to the base station 103 (S011) and the base station 103 compares the received information with the attribute value included in the base station 103 and changes the attribute value of the base station 103. Further, the radio base station control device 3, which will be described later, may determine which one of the attribute values of the base stations is to be changed.

In this manner, the attributes of the handover setting, the blacklist setting, and the LB setting can be matched, thereby making it possible to prevent handover failure and load balancing failure from occurring due to a mismatch caused by a setting error by the operator, or a difference in the set logic in the radio base stations 100 and 103. Further, when the MRO (Mobility Robustness Optimization) is used to prohibit a handover and load balancing of a certain radio base station A to a neighboring radio base station B, the attribute values for the handover and load balancing can be matched by prohibiting the neighboring radio base station B from performing a handover and load balancing to the radio base station A. Consequently, the occurrence of handover failure and load balancing failure can be prevented.

Explanation of Advantageous Effects

The first exemplary embodiment provides the following advantageous effects.

(1) The neighboring information shared between the radio base stations can be made known.

(2) After a first operation is achieved, if the attribute value for the radio base station B is incorrectly set by the radio base station A, the setting of the attribute value for the radio base station A by the neighboring radio base station B is evaluated and the setting of the attribute value to be actually transmitted to the radio base station B from the radio base station A is updated, thereby making it possible to prevent a mismatch in the setting of attribute values between the radio base stations due to an error caused by an external factor.

(3) As a result of achieving the operations (1) and (2), the unified neighboring cell information can be made known to each mobile terminal under control of a base station.

(4) As a result of achieving the operations (1) and (2), the number of occurrences of handover failure of the mobile terminal can be reduced.

(5) As a result of achieving the operations (1) and (2), when an attribute value is set to a neighboring cell by using an algorithm, such as MRO (Mobility Robustness Optimization) or SON algorithms, a mismatch between the attribute values of the radio base stations can be eliminated and the number of occurrences of handover failure of the mobile terminal can be reduced.

(6) As a result of achieving the operations (1) and (2), the mismatch between the attribute values of the radio base stations due to a difference in EM (Element Manager) or NM (Network Manager), which is disclosed in Non Patent Literature 1, can be eliminated, and the number of occurrences of handover failure of the mobile terminal can be reduced.

(7) As a result of achieving the operations (1) and (2), the load balancing control can be performed between the radio base stations, and traffic load distribution can be performed appropriately.

The above exemplary embodiment has been described by using the attribute value determined for each base station, but the attribute value is not limited to this. Any other information can be used as the attribute value as long as it can discriminate a handover control, load balancing, and blacklist setting of each base station.

Second Exemplary Embodiment

A second exemplary embodiment relates to a processing mode for unifying attributes for cells between radio base stations by using different communication modes.

Explanation of System Configuration

The configuration of a radio communication system according to the second exemplary embodiment is the same as that of the first exemplary embodiment. In the first exemplary embodiment, FIG. 1 illustrates an LTE radio base station. The second exemplary embodiment can be applied to, for example, a combination of a 3G communication mode for the radio base station 100 and an LTE communication mode for the radio base station 103. The second exemplary embodiment can also be applied to, for example, a combination of a 2G communication mode for the radio base station 100 and an LTE communication mode for the radio base station 103. In another alternative, the second exemplary embodiment can be applied to a combination of a 2G communication mode for the radio base station 100 and a 3G communication mode for the radio base station 103. In this case, attribute values (regarding a handover setting and a blacklist setting) of neighboring cell information between different radio base stations can be exchanged via a core network (core communication network) by using the RIM (RAN (Radio Access Network) Information Management) disclosed in Non Patent Literature 7 (RIM is hereinafter referred to as "local area network information control"). The attribute values of the neighboring cell information between the radio base stations can be exchanged between LTE-advanced relay nodes B.

Explanation of Operation

In the second exemplary embodiment, the operation that is basically the same as that of the first exemplary embodiment is carried out. However, the information about the attribute values of neighboring cells between different radio base stations is exchanged via a core network by using the RIM as described above.

The base station 100 updates the setting of the attribute values by the same method as that of the first exemplary embodiment.

Explanation of Advantageous Effects

The second exemplary embodiment provides not only the advantageous effects obtained in the first exemplary embodiment, but also the following advantageous effect.

(1) The neighboring cell information can be shared between radio base stations with different access methods.

Third Exemplary Embodiment

The operation of a third exemplary embodiment is the same as that of the first or second exemplary embodiment. The operation of the third exemplary embodiment differs from the operation of the first or second exemplary embodiment in that the update of settings is applied not only to a handover setting and a blacklist setting, but also to an attribute value for setting as to whether a removal from a neighboring cell list is permitted or prohibited (is Remove Allowed disclosed in Non Patent Literature 3 and No Remove disclosed in Non Patent Literature 4), an attribute value indicating a neighboring cell priority, an attribute value indicating whether or not the cell is a neighboring cell for handover, an attribute value indicating whether or not the cell is a neighboring cell for preventing PCI duplication (collision/confusion), an attribute value indicating whether the execution of S1/X2HO is permitted or prohibited, and an attribute value for direct/indirect forwarding.

The neighbor attribute value of EUtran Relation class that is disclosed in Non Patent Literature 3 is also included. As specific attribute values, (is Remove Allowed, is ICIC Information Send Allowed) is included for each neighboring cell, and x2Black List, x2White List, x2HO Black List, and the like of ENB Function class are included for each neighboring base station. These attribute values are associated with interference between cells.

This exemplary embodiment aims to achieve a two-way interference control between the cells A and B by unifying "is ICIC Information Send Allowed" between the cells A and B.

Explanation of System Configuration

The configuration of a radio communication system according to the third exemplary embodiment is the same as that of the first exemplary embodiment.

Explanation of Operation

The operation of the radio communication system according to the third exemplary embodiment is the same as that of the first exemplary embodiment.

Explanation of Advantageous Effects

The third exemplary embodiment provides not only the advantageous effects obtained in the first exemplary embodiment, but also the following advantageous effects.

(1) Not only the handover attribute values, but also the attribute values of the adjacent cell information can be made known to each mobile terminal under control of a base station.

(2) Interference between cells can be prevented.

Fourth Exemplary Embodiment

A fourth exemplary embodiment relates to a method in which an attribute value to be actually set to a neighboring cell is determined from an attribute value of a radio base station and an attribute value of a neighboring radio base station, assuming that the cells regard a third cell as the neighboring cell, based on an exchange of information about the attributes of the cells between the radio base stations.

Explanation of System Configuration

Figure 12:
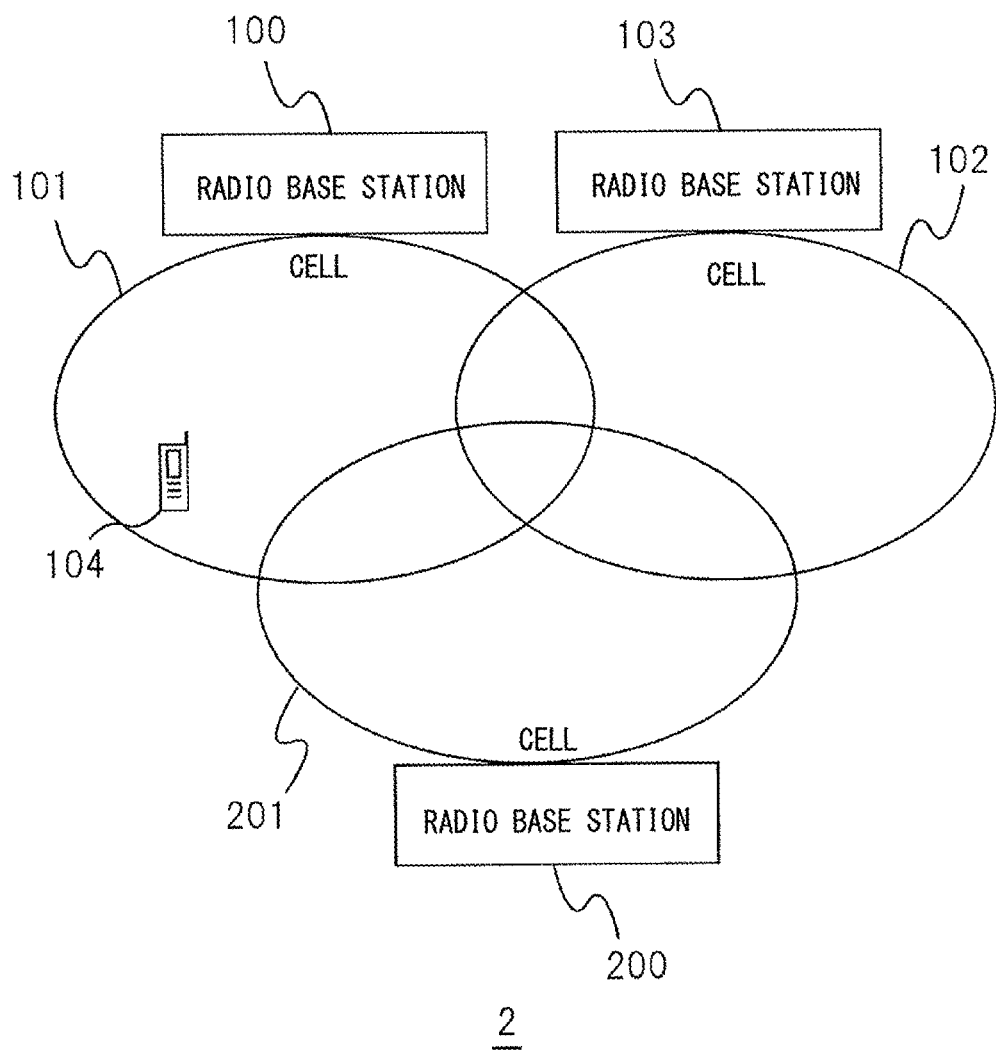
FIG. 12 is a schematic diagram showing a fourth exemplary embodiment.

FIG. 12 shows a configuration of a radio communication system 2 according to the fourth exemplary embodiment. A cell 201 of a radio base station 200 is additionally provided in the configuration of the radio communication system 1 according to the first exemplary embodiment.

Explanation of Operation

While the cells 101 and 102 regard the cell 201 as a neighboring cell as shown in FIG. 12, this exemplary embodiment is intended to unify the attribute values and eliminate a mismatch between the actual attribute setting for the cell 201 by the cell 101 and the actual attribute value setting for the cell 201 by the cell 102. An example in which a mismatch between the handover attribute values occurs as described below will now be considered.

The actual handover setting of the radio base station 100 from the cell 101 to the cell 201 indicates "No".

The actual handover setting of the radio base station 103 from the cell 102 to the cell 201 indicates "Yes".

If a mismatch between the attribute values occurs as mentioned above, the settings for each actual handover can be matched to "Yes" or "No".

Figure 14:
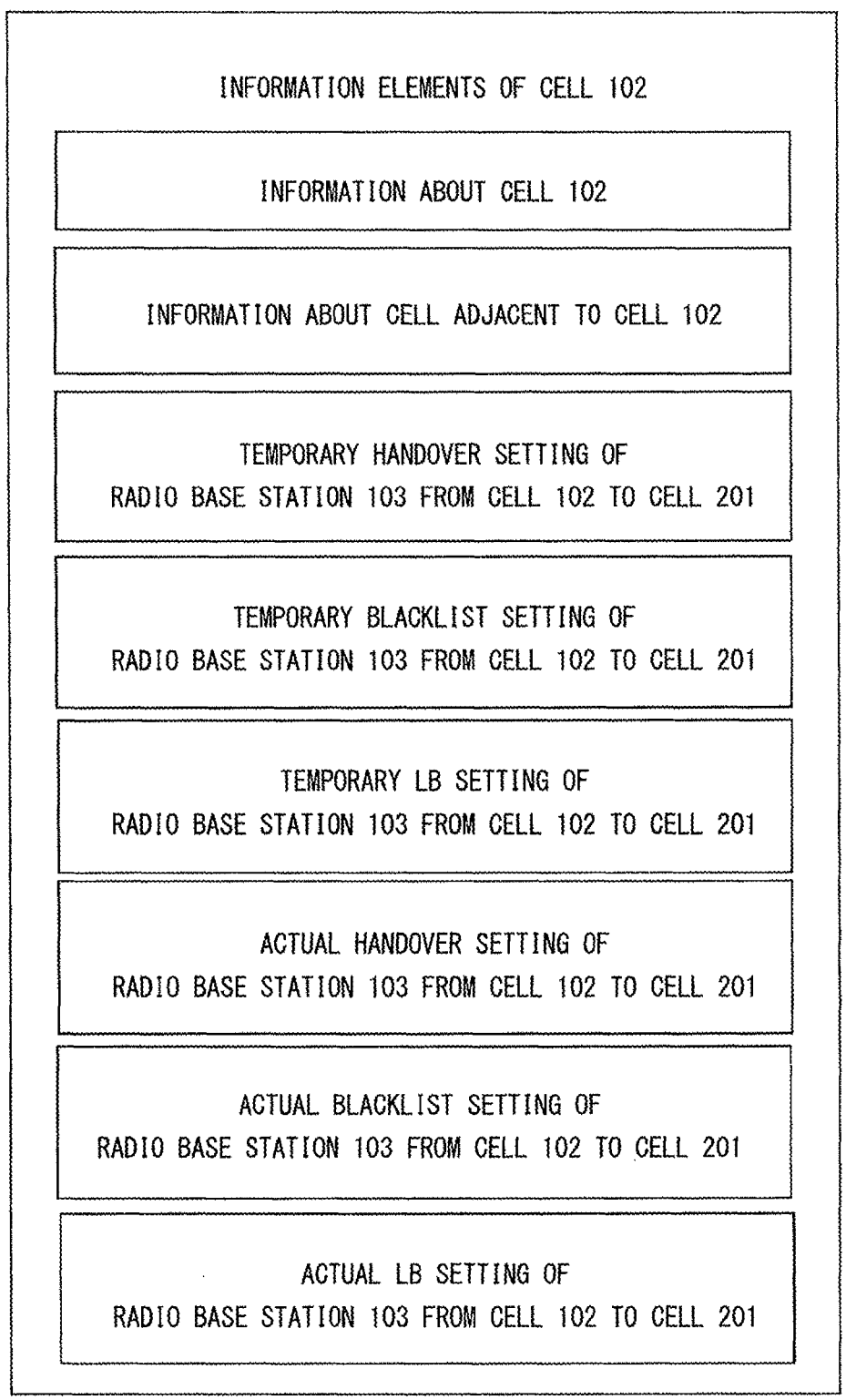
FIG. 14 shows information elements of the cell 102 which are transmitted from the radio base station 103 to the radio base station 100 according to the fourth exemplary embodiment.

The operation of the fourth exemplary embodiment is similar to the operation of the first exemplary embodiment shown in FIG. 8. The operation of the fourth exemplary embodiment differs from that of the first exemplary embodiment in that the radio base station 100 receives, from the radio base station 103, the attribute value relating to the radio base station 200, which is included in the radio base station 103, as shown in FIG. 14, compares the received attribute value with the attribute value relating to the radio base station 200, which is included in the radio base station 100, as shown in FIG. 14, and updates the attribute value relating to the base station 200.

Figure 13:
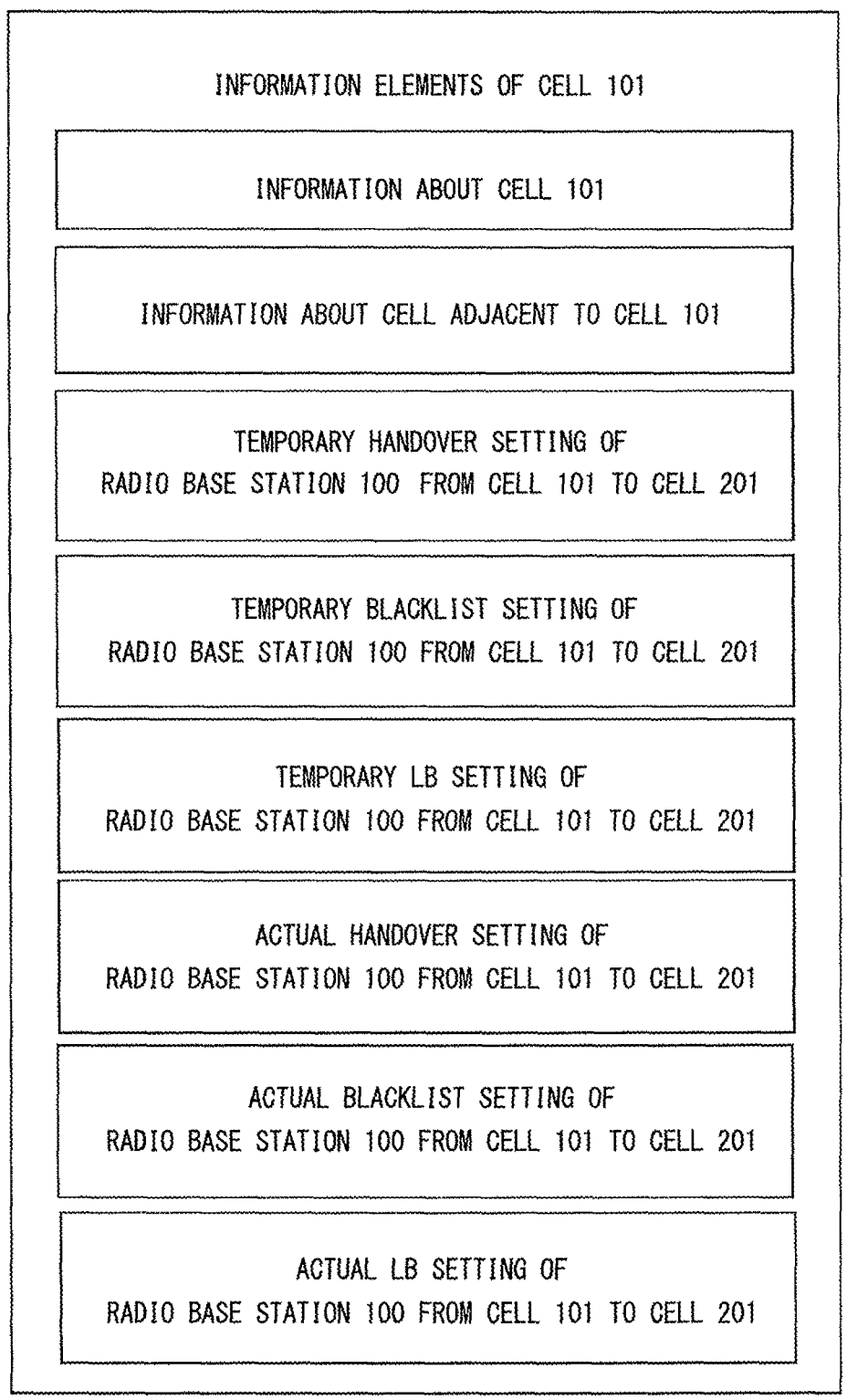
FIG. 13 shows information elements of the cell 101 which are transmitted from the radio base station 100 to the radio base station 103 according to the fourth exemplary embodiment.

Similarly, the base station 103 receives, from the base station 100, the attribute values relating to the base station 100 and the base station 200 as shown in FIG. 13, and compares the received attribute values with the attribute value relating to the radio base station 200, which is included in the radio base station 103, thereby making it possible to change the attribute value relating to the base station 200.

Accordingly, the unification of the attribute values of the neighboring cells is applicable not only to the case of unifying the attribute values between two cells, but also to the case of unifying the attribute values for the cell 201 of the radio base station 200 between the cell 101 and the cell 102. Consequently, the occurrence of the following handover failure can be prevented.

The actual handover setting of the radio base station 100 between the cell 101 and the cell 102 indicates "Yes".

The actual handover setting of the radio base station 100 between the cell 101 and the cell 201 indicates "No".

The actual handover setting of the radio base station 103 between the cell 102 and the cell 201 indicates "Yes".

The mobile terminal present in the cell 101 cannot move directly from the cell 101 to the cell 201.

However, in a case where the mobile terminal moves from the cell 101 to the cell 201 via the cell 102, and then returns from the cell 201 to the cell 101, (1) The handover from the cell 101 to the cell 102 is successful.

(2) The handover from the cell 102 to the cell 201 is successful.

(3) Since the handover from the cell 201 to the cell 101 is prohibited, the mobile terminal moves to another cell, or a communication disconnection occurs.

As described above, a plurality of neighboring cells can unify the attribute values for a certain cell, so that the number of occurrences of handover failure between the cells can be reduced. The number of occurrences of handover failure and LB failure can also be reduced by applying the unification of attribute values to a blacklist setting, an LB setting, and the like.

Explanation of Advantageous Effects

The fourth exemplary embodiment provides not only the advantageous effects obtained in the first exemplary embodiment, but also the following advantageous effects.
(1) When both the first cell and the second cell of different radio base stations are adjacent to the third cell, the third cell attribute value of the first cell and the third cell attribute value of the second cell can be unified.
(2) As a result of achieving the operation (1), the number of occurrences of handover failure and load balancing failure between the first cell and the third cell and between the second cell and the third cell can be reduced.

Fifth Exemplary Embodiment

A fifth exemplary embodiment relates to a processing mode in which "is LB Allowed" can be unified between radio base stations even in a case where a MOBILITY CHANGE FAILURE message indicating that load balancing is not to be executed is returned as a cause value when a MOBILITY CHANGE REQUEST message is sent from a certain radio base station to a neighboring radio base station for the attribute value relating to load balancing, to transmit "is LB Allowed", that is, when "is LB Allowed" is set so as to indicate "No".

Explanation of System Configuration

The configuration of a radio communication system according to the fifth exemplary embodiment is similar to the configuration of the first exemplary embodiment shown in FIG. 1.

Explanation of Operation

In the fifth exemplary embodiment, the operation with the following settings is considered.

The temporary LB (Load Balancing) setting of the radio base station 100 from the cell 101 to the cell 102 is ON.

The temporary LB (Load Balancing) setting of the radio base station 103 from the cell 102 to the cell 101 is OFF.

Figure 15:
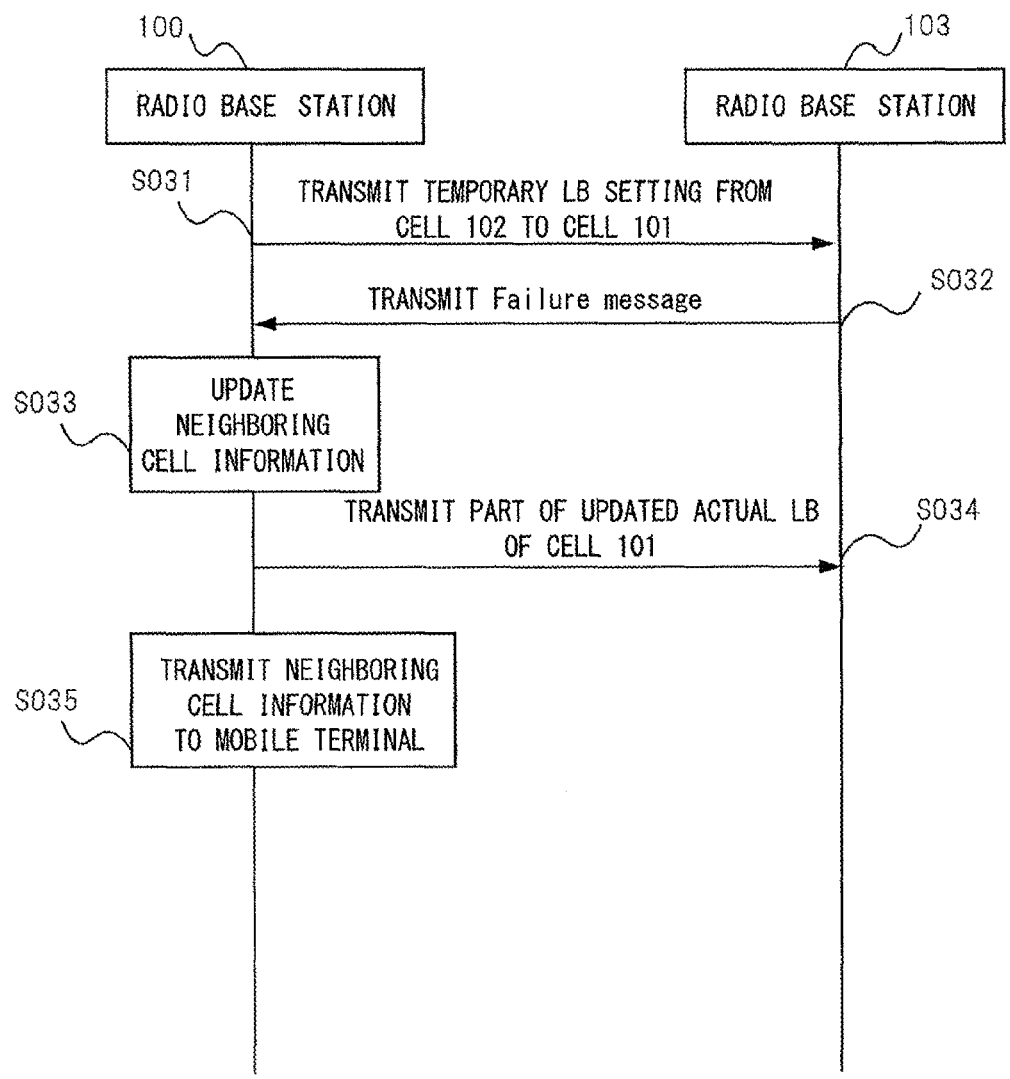
FIG. 15 is a diagram showing an operation in which the radio base station 100 and the radio base station 103 according to a fifth exemplary embodiment mutually transmit the respective neighboring cell information elements.

The operation will be described below with reference to the flowchart of FIG. 15.

The inter-base-station message processing unit 111 in the radio base station 100 reads out the information about the cell 101, which is stored in the database unit 112 in the radio base station 100, and sends, to the radio base station 103, the temporary LB setting from the cell 102 to the cell 101 (S031).

Since the temporary LB setting from the cell 102 to the cell 101 is OFF, the inter-base-station message processing unit 111 in the radio base station 103 reads out the information about the cell 102, which is stored in the database unit 112 in the radio base station 103, and sends, to the radio base station 100, a cause value including a failure message indicating that load balancing is not to be executed (S032).

The inter-base-station message processing unit 111 in the radio base station 100 receives the failure message from the radio base station 103 and sets "OFF" as the actual LB setting of the radio base station 100 from the cell 101 to the cell 102, and the database unit 112 in the radio base station 100 stores the actual LB setting (S033).

The inter-base-station message processing unit 111 in the radio base station 100 reads out, from the database unit 112, the cell information partially including the updated actual LB setting (OFF) of the radio base station 100 from the cell 101 to the cell 102, and sends the read information to the radio base station 103. The inter-base-station message processing unit 111 in the radio base station 103 receives the actual LB setting (OFF), and sends the received setting to the database unit 112 in the radio base station 103. The database unit 112 in the radio base station 103 stores the actual LB setting (OFF). Then the database unit 112 in the radio base station 103 updates the actual LB setting (OFF) (S034).

After that, the radio communication processing unit 110 in the radio base station 100 transmits the information elements of the neighboring cell 102, which are read out from the database unit 112, to the mobile terminal 104 under control of the cell 101 (S035).

The radio base station 100 transmits, to the radio base station 103, "is LB Allowed" included in MOBILITY CHANGE REQUEST. After that, the radio base station 103 returns MOBILITY CHANGE FAILURE including "is LB Allowed" to the radio base station 100. In this exemplary embodiment, as shown in FIG. 16, "is LB Allowed" is included in the cause value in the configuration of the MOBILITY CHANGE FAILURE message.

Explanation of Advantageous Effects

The fifth exemplary embodiment provides not only the advantageous effects obtained in the first exemplary embodiment, but also the following advantageous effects.
(1) In a case where a mismatch between the attribute values for load balancing of the radio base stations occurs, even when a certain radio base station sends an attribute value for load balancing to a neighboring radio base station and the neighboring radio base station returns a failure message, the radio base station which has received the failure message can match the attribute value for load balancing with that of the neighboring radio base station.

Other Exemplary Embodiment

While an operation according to other exemplary embodiment is similar to that of the first exemplary embodiment, the exchange of the neighboring cell information is performed not via an interface between base stations, but via the radio base station control device 3, which controls radio base stations, or the relay device 4. For example, the radio base station 100 executes a network monitoring mode to read notification information about the cell 102 of the radio base station 103, and acquires the attribute value corresponding to the neighboring information about the cell 102. In another alternative, the radio base station 100 may instruct the mobile terminal 104 to acquire the attribute value corresponding to the neighboring information about the neighboring cell 102 from the notification information about the cell 102 of the radio base station 103, and the radio base station 100 may cause the mobile terminal 104 to inform the radio base station 100 of the information.

While the algorithm for unifying attribute values is carried out in the radio base stations according to the first exemplary embodiment, the radio base station control device 3, which controls the radio base stations, the relay device 4, O & M, EM (Element Manager), NM (Network Manager), a gateway, and the like may carry out the algorithm for unifying attribute values.

While the unification of attribute values between the radio base stations is automatically performed in the first exemplary embodiment, the attribute values may be manually matched between the radio base stations after the attribute values are temporarily transmitted to the EM via the radio base stations and a mismatch between the attribute values is checked by an operator.

While the attribute values defined in the 3GPP standard are used to describe the above exemplary embodiments, the attribute values are not limited these values. Any information may be used as the attribute values as long as the information has the same meaning as that of the above-mentioned attribute values.

The communication control method described in the above exemplary embodiments may be implemented by using a semiconductor processing device including an ASIC (Application Specific Integrated Circuit). These processes may be implemented by causing a computer system including at least one processor (e.g., a microprocessor, an MPU, or a DSP (Digital Signal Processor)) to execute a program. Specifically, one or more programs including an instruction set for causing the computer system to execute an algorithm relating to transmission signal processing or reception signal processing may be created, and the programs may be supplied to a computer.

These programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The programs may be provided to a computer using any type of transitory computer readable media. Examples of transitory computer readable media include electric signals, optical signals, and electromagnetic waves. Transitory computer readable media can provide the programs to a computer via a wired communication line, such as electric wires and optical fibers, or a radio communication line.

The present invention is not limited to the above exemplary embodiments and can be modified as needed without departing from the scope of the invention. For example, the present invention is also applicable to higher communication standards such as fourth and higher generation communication standards (for example, LTE-Advanced, IMT-Advanced, and WiMAX2).

Moreover, the above exemplary embodiments are merely examples of the application of the technical idea that the present inventor has conceived. In other words, the technical idea is not limited to the above exemplary embodiments and can be modified in various manners as a matter of course.

The whole or part of the exemplary embodiments disclosed above can be described as, but not limited to, the following supplementary notes.

(Supplementary Note 1)

A communication control method comprising:

transmitting, by a second radio base station adjacent to a first radio base station, an attribute value relating to a second cell to the first radio base station, the second cell being under control of the second radio base station;

receiving, by the first radio base station, the attribute value relating to the second cell;

comparing, by the first radio base station, the attribute value relating to the second cell with an attribute value relating to a first cell, the first cell being under control of the first radio base station; and executing, by the first radio base station, processing for matching the attribute value relating to the second cell with the attribute value relating to the first cell in accordance with a predetermined criterion, when the received attribute value relating to the second cell is different from the attribute value relating to the first cell.

(Supplementary Note 2)

The communication control method according to Supplementary note 1, wherein the attribute value includes at least one of handover permission/prohibition information, measurement permission/prohibition information, and load distribution control permission/prohibition information.

(Supplementary note 3)

The communication control method according to Supplementary note 1 or 2, wherein the attribute value relating to the second cell is added to information associated with a neighboring cell and is transmitted from the second radio base station to the first radio base station.

(Supplementary Note 4)

The communication control method according to any one of Supplementary notes 1 to 3, wherein when a communication mode for the first radio base station is different from a communication mode for the second radio base station, the attribute value is transmitted and received via a communication network to which the first radio base station and the second radio base station are connected.

(Supplementary Note 5)

The communication control method according to Supplementary note 1, wherein the attribute value is transmitted and received during a control of local area network information.

(Supplementary Note 6)

The communication control method according to Supplementary note 1, wherein load distribution control permission/prohibition information is used as an attribute value during a load distribution control.

(Supplementary Note 7)

A communication control method comprising:

acquiring an attribute value relating to a first cell under control of a first radio base station, and acquiring an attribute value relating to a second cell under control of a second radio base station; and matching the attribute value relating to the first cell with the attribute value relating to the second cell in accordance with a predetermined criterion, when the acquired attribute value relating to the first cell is different from the acquired attribute value relating to the second cell.

(Supplementary Note 8)

The communication control method according to any one of Supplementary notes 1 to 7, wherein the attribute value is transmitted and received via a radio base station control device that controls a radio base station.

(Supplementary Note 9)

A radio communication system comprising:

a first radio base station; and a second radio base station adjacent to the first radio base station, wherein the second radio base station comprises:

means for transmitting, to the first radio base station, an attribute value relating to a second cell under control of the second radio base station, and the first radio base station comprises:
means for receiving, by the first radio base station, the attribute value relating to the second cell; and
means for matching the attribute value relating to the second cell with an attribute value relating to a first cell in accordance with a predetermined criterion, when the attribute value relating to the second cell is different from the attribute value relating to the first cell, the first cell being under control of the first radio base station.

(Supplementary Note 10)
The radio communication system according to Supplementary note 9, wherein the attribute value includes at least one of handover permission/prohibition information, measurement permission/prohibition information, and load distribution control permission/prohibition information.

(Supplementary Note 11)
The radio communication system according to Supplementary note 9, wherein the attribute value relating to the second cell is added to information associated with a neighboring cell and is transmitted from the second radio base station to the first radio base station.

(Supplementary Note 12)
The radio communication system according to any one of Supplementary notes 9 to 11, wherein when a communication mode for the first radio base station is different from a communication mode for the second radio base station, the attribute value is transmitted and received via a communication network to which the first radio base station and the second radio base station are connected.

(Supplementary Note 13)
The radio communication system according to Supplementary note 12, wherein the attribute value is transmitted and received during a control of local area network information.

(Supplementary Note 14)
The radio communication system according to Supplementary note 9, wherein load distribution control permission/prohibition information is used as an attribute value during a load distribution control.

(Supplementary Note 15)
A radio communication system comprising:
means for acquiring an attribute value relating to a first cell under control of a first radio base station, and acquiring an attribute value relating to a second cell under control of a second radio base station; and
means for matching the attribute value relating to the first cell with the attribute value relating to the second cell in accordance with a predetermined criterion, when the acquired attribute value relating to the first cell is different from the acquired attribute value relating to the second cell.

(Supplementary Note 16)
The radio communication system according to any one of Supplementary notes 9 to 15, wherein the attribute value is transmitted and received via a radio base station control device that controls a radio base station.

(Supplementary Note 17)
A radio base station comprising:
means for acquiring an attribute value relating to a first cell under control of a neighboring radio base station; and
means for matching the attribute value relating to the first cell with an attribute value relating to a second cell in accordance with a predetermined criterion, when the acquired attribute value relating to the first cell is different from the attribute value relating to the second cell, the second cell being under control of the radio base station.

(Supplementary Note 18)
The radio base station according to Supplementary note 17, wherein the attribute value includes at least one of handover permission/prohibition information, measurement permission/prohibition information, and load distribution control permission/prohibition information.

(Supplementary Note 19)
The radio base station according to Supplementary note 17, wherein the attribute value relating to the second cell is added to information associated with a neighboring cell and is transmitted from the second radio base station to the first radio base station.

(Supplementary Note 20)
The radio base station according to any one of Supplementary notes 17 to 19, wherein when a communication mode for the first radio base station is different from a communication mode for the second radio base station, the attribute value is transmitted and received via a communication network to which the first radio base station and the second radio base station are connected.

(Supplementary Note 21)
The radio base station according to Supplementary note 17, wherein the attribute value is transmitted and received during a control of local area network information.

(Supplementary Note 22)
The radio base station according to Supplementary note 17, wherein load distribution control permission/prohibition information is used as an attribute value during a load distribution control.

(Supplementary Note 23)
The radio base station according to any one of Supplementary notes 17 to 22, wherein the attribute value is transmitted and received via a radio base station control device that controls a radio base station.

(Supplementary Note 24)
A non-transitory computer readable medium causing a computer to execute processing comprising:
acquiring an attribute value relating to a first cell under control of a first radio base station, and acquiring an attribute value relating to a second cell under control of a second radio base station; and
matching the attribute value relating to the first cell with the attribute value relating to the second cell in accordance with a predetermined criterion, when the acquired attribute value relating to the first cell is different from the acquired attribute value relating to the second cell.

(Supplementary Note 25)
The non-transitory computer readable medium according to Supplementary note 24, wherein the attribute value includes at least one of handover permission/prohibition information, measurement permission/prohibition information, and load distribution control permission/prohibition information.

(Supplementary Note 26)
The non-transitory computer readable medium according to Supplementary note 24, wherein the attribute value relating to the second cell is added to information associated with a neighboring cell and is transmitted from the second radio base station to the first radio base station.

(Supplementary Note 27)
The non-transitory computer readable medium according to any one of Supplementary notes 24 to 26, wherein when a communication mode for the first radio base station is different from a communication mode for the second radio base station, the attribute value is transmitted and received via a communication network to which the first radio base station and the second radio base station are connected.

(Supplementary Note 28)

The non-transitory computer readable medium according to Supplementary note 25, wherein the attribute value is transmitted and received during a control of local area network information.

(Supplementary Note 29)

The non-transitory computer readable medium according to Supplementary note 24, wherein load distribution control permission/prohibition information is used as an attribute value during a load distribution control.

(Supplementary Note 30)

A non-transitory computer readable medium causing a computer to execute processing comprising:

acquiring an attribute value relating to a first cell under control of a first radio base station, and acquiring an attribute value relating to a second cell under control of a second radio base station; and matching the attribute value relating to the first cell with the attribute value relating to the second cell in accordance with a predetermined criterion, when the acquired attribute value relating to the first cell is different from the acquired attribute value relating to the second cell.

(Supplementary Note 31)

The non-transitory computer readable medium according to any one of Supplementary notes 25 to 30, wherein the computer is caused to execute transmission and reception of the attribute value via a radio base station control device that controls a radio base station.

While the present invention has been described above with reference to exemplary embodiments, the present invention is not limited to the above exemplary embodiments. The configuration and details of the present invention can be modified in various manners which can be understood by those skilled in the art within the scope of the invention.

This application is based upon and claims the benefit of priority from Japanese patent application No. 2012-249670, filed on Nov. 13, 2012, the disclosure of which is incorporated herein in its entirety by reference.

REFERENCE SIGNS LIST

1 RADIO COMMUNICATION SYSTEM
2 RADIO COMMUNICATION SYSTEM
3 RADIO BASE STATION CONTROL DEVICE
4 RELAY DEVICE
100 RADIO BASE STATION
101 CELL
102 CELL
103 RADIO BASE STATION
104 MOBILE TERMINAL
105 MOBILE TERMINAL
110 RADIO COMMUNICATION PROCESSING UNIT
111 INTER-BASE-STATION MESSAGE PROCESSING UNIT
112 DATABASE UNIT
200 RADIO BASE STATION
201 CELL

The invention claimed is:

1. A communication control method comprising:
transmitting, by a second radio base station adjacent to a first radio base station, an information element including information about an attribute value relating to a second cell to the first radio base station, the second cell being under control of the second radio base station;

receiving, by the first radio base station, the information element including the information about the second cell attribute value;

comparing, by the first radio base station, a first temporary attribute value with a second temporary attribute value, the first temporary attribute value being information about an attribute value of a first cell and set when the first cell attribute value is changed, the second temporary attribute value being information about the second cell attribute value included in the information element and set when the second cell attribute value is changed, the first cell being under control of the first radio base station; and executing, by the first radio base station, processing for matching a first actual attribute value with a second actual attribute value in accordance with a predetermined criterion, when the received second temporary attribute value of the second cell is different from the first temporary attribute value of the first cell, the first actual attribute value being information about the first cell attribute value and used for actual control, the second actual attribute value being information about the second cell attribute value and used for actual control.

2. The communication control method according to claim 1, wherein the attribute values include at least one of handover permission/prohibition information, measurement permission/prohibition information, and load distribution control permission/prohibition information.

3. The communication control method according to claim 2, wherein the second cell attribute value is added to information associated with a neighboring cell and is transmitted from the second radio base station to the first radio base station.

4. The communication control method according to claim 3, wherein when a communication mode for the first radio base station is different from a communication mode for the second radio base station, the second cell attribute value is transmitted and received via a communication network to which the first radio base station and the second radio base station are connected.

5. The communication control method according to claim 4, wherein the second cell attribute value is transmitted and received during a control of local area network information.

6. The communication control method according to claim 3, wherein the second cell attribute value is transmitted and received via a radio base station control device that controls a radio base station.

7. A communication control method comprising:
acquiring an information element including information about an attribute value of a second cell under control of a second radio base station, transmitted from the second radio base station;

comparing a first temporary attribute value with a second temporary attribute value, the first temporary attribute value being information about an attribute value of a first cell and set when the first cell attribute value is changed, the second temporary attribute value being information about the second cell attribute value included in the information element and set when the second cell attribute value is changed, the first cell being under control of a first radio base station; and matching a first actual attribute value with a second actual attribute value in accordance with a predetermined criterion, when the first temporary attribute value is different from the second temporary attribute value, the first actual attribute value being information about the first cell attribute value and used for actual control, the second actual attribute value being information about the second cell attribute value and used for actual control.

8. A radio communication system comprising:
a first radio base station; and
a second radio base station adjacent to the first radio base station,
wherein the second radio base station comprises:
a transmitter that transmits to the first radio base station an information element including information about an attribute value of a second cell under control of the second radio base station, and
the first radio base station comprises:
a receiver that receives the information element transmitted from the second base station, and
one or more processors configured to
compare a first temporary attribute value with a second temporary attribute value, the first temporary attribute value being information about an attribute value of a first cell and set when the first cell attribute value is changed, the second temporary attribute value being information about the second cell attribute value included in the information element and set when the second cell attribute value is changed, the first cell being under control of the first radio base station, and
match a first actual attribute value with a second actual attribute value in accordance with a predetermined criterion, when the first temporary attribute value is different from the second temporary attribute value, the first actual attribute value being information about the first cell attribute value and used for actual control, the second actual attribute value being information about the second cell attribute value and used for actual control.

9. A radio base station comprising:
one or more processors configured to
acquire an information element including information about an attribute value of a second cell under control of another radio base station,
compare a first temporary attribute value with a second temporary attribute value, the first temporary attribute value being information about an attribute value of a first cell and set when the first cell attribute value is changed, the second temporary attribute value being information about the second cell attribute value included in the information element and set when the second cell attribute value is changed, the first cell being under control of the radio base station itself, and
match a first actual attribute value with a second actual attribute value in accordance with a predetermined criterion, when the first temporary attribute value is different from the second temporary attribute value, the first actual attribute value being information about the first cell attribute value and used for actual control, the second actual attribute value being information about the second cell attribute value and used for actual control.

10. A non-transitory computer readable medium causing a computer to execute processing comprising:
acquiring an information element including information about an attribute value of a second cell under control of a second radio base station, transmitted from the second radio base station;
comparing a first temporary attribute value with a second temporary attribute value, the first temporary attribute value being information about an attribute value of a first cell and set when the first cell attribute value is changed, the second temporary attribute value being information about the second cell attribute value included in the information element and set when the second cell attribute value is changed, the first cell being under control of a first radio base station; and
matching a first actual attribute value with a second actual attribute value in accordance with a predetermined criterion, when the first temporary attribute value is different from the second temporary attribute value, the first actual attribute value being information about the first cell attribute value and used for actual control, the second actual attribute value being information about the second cell attribute value and used for actual control.

11. The communication control method according to claim 1, wherein the second cell attribute value is added to information associated with a neighboring cell and is transmitted from the second radio base station to the first radio base station.

12. The communication control method according to claim 1, wherein when a communication mode for the first radio base station is different from a communication mode for the second radio base station, the second cell attribute value is transmitted and received via a communication network to which the first radio base station and the second radio base station are connected.

13. The communication control method according to claim 2, wherein when a communication mode for the first radio base station is different from a communication mode for the second radio base station, the second cell attribute value is transmitted and received via a communication network to which the first radio base station and the second radio base station are connected.

14. The communication control method according to claim 1, wherein the second cell attribute value is transmitted and received via a radio base station control device that controls a radio base station.

15. The communication control method according to claim 2, wherein the second cell attribute value is transmitted and received via a radio base station control device that controls a radio base station.

16. The communication control method according to claim 4, wherein the second cell attribute value is transmitted and received via a radio base station control device that controls a radio base station.

17. The communication control method according to claim 5, wherein the second cell attribute value is transmitted and received via a radio base station control device that controls a radio base station.

18. The communication control method according to claim 11, wherein the second cell attribute value is transmitted and received via a radio base station control device that controls a radio base station.

19. The communication control method according to claim 12, wherein the second cell attribute value is transmitted and received via a radio base station control device that controls a radio base station.

20. The communication control method according to claim 13, wherein the second cell attribute value is transmitted and received via a radio base station control device that controls a radio base station.

* * * * *